United States Patent [19]
Rhee

[11] Patent Number: 6,104,757
[45] Date of Patent: Aug. 15, 2000

[54] SYSTEM AND METHOD OF ERROR CONTROL FOR INTERACTIVE LOW-BIT RATE VIDEO TRANSMISSION

[75] Inventor: Injong Rhee, Raleigh, N.C.

[73] Assignee: North Carolina State University, Raleigh, N.C.

[21] Appl. No.: 09/079,621

[22] Filed: May 15, 1998

[51] Int. Cl.[7] .................................................. H04B 1/66
[52] U.S. Cl. .......................... 375/240; 348/409; 348/412; 348/845.1; 714/18; 714/48
[58] Field of Search .......................... 375/240; 348/845.1, 348/409, 412; 714/18, 48

[56] References Cited

U.S. PATENT DOCUMENTS

| | | | |
|---|---|---|---|
| 5,680,322 | 10/1997 | Shinoda | 714/18 |
| 5,767,907 | 6/1998 | Pearlstein | 348/392 |
| 5,794,018 | 8/1998 | Vrvilo | 713/400 |

OTHER PUBLICATIONS

Albanese et al., "Priority Encoding Transmission", *IEEE Transactions on Information Theory*, vol. 42, No. 6, (written Aug. 1994; published Nov. 1996), pp. 1–34.

Amir et al., "A Layered DCT Coder for Internet Video", *The Proceedings of IEEE International Conference on Image Processing*, (Sep. 1996).

Bolot, "Characterizing End–to–End Packet Delay and Loss in the Internet", *Journal of High–Speed Networks*, vol. 2, No. 3, (Dec. 1993), pp. 305–323.

Bolot et al., "The Case for FEC–Based Error Control for Packet Audio in the Internet", to appear in *ACM Multimedia Systems*, (believed to be no earlier than Mar. 1996).

Dempsey et al., "On Retransmission–Based Error Control for Continuous Media Traffic in Packet–Switching Networks", *Computer Networks and ISDN Systems*, (1996), pp. 1–24.

Dorcey, "CU–SeeMe Desktop VideoConferencing Software", *ConneXions*, vol. 9, No. 3, (Mar. 1995).

Ghanbari, "Two–Layer Coding of Video Signals for VBR Networks", *IEEE Journal on Selected Areas in Communications*, vol. 7, No. 5, (Jun. 1989), pp. 771–781.

Li et al., "Layered Video Multicast with Retransmission (LVMR): Evaluation of Error Recovery Schemes", *Proceedings of the Sixth International Workshop on Network and Operating System Support for Digital Audio and Video*, (May 1997), pp. 1–5.

McCanne et al., "vic: A Flexible Framework for Packet Video", *Proceedings of ACM Multimedia '95*, (Nov. 1995), pp. 511–522.

McCanne et al., "Low–Complexity Video Coding for Receiver–Driven Layered Multicast", *IEEE Journal on Selected Areas in Communications*, vol. 16, No. 6, (Aug. 1997), pp. 983–1001.

McCanne et al., "Receiver–Driven Layered Multicast", *Proceedings of ACM SIGCOMM*, (Aug. 1996), pp. 117–130.

Papadopoulos et al., "Retransmission–Based Error Control for Continuous Media Applications", *Proceedings from the Sixth International Workshop on Network and Operating System Support for Digital Audio and Video*, (1996), pp. 5–12.

(List continued on next page.)

*Primary Examiner*—Howard Britton
*Attorney, Agent, or Firm*—Jenkins & Wilson, P.A.

[57] ABSTRACT

A new retransmission-based error control technique that does not incur any additional latency in frame playout times and is suitable for interactive video applications. This retransmission technique combined with layered video coding yields good error resilience for interactive video conferencing. The technique exploits the temporal dependency of inter-coded frames and can be easily incorporated into motion-compensation based coding standards such as MPEG and H.261, achieving very good compression efficiency.

22 Claims, 18 Drawing Sheets

OTHER PUBLICATIONS

Posnak et al., "Techniques for Resilient Transmission of JPEG Video Streams", *The Proceedings of Multimedia Computing and Networking*, vol. 2417, (written Sep. 1994; published Feb. 1995), pp. 243–252.

Ramamurthy et al., "Performance of Packet Video with Combined Error Recovery and Concealment", *Proceedings of INFOCOM '95*, (Apr. 1995), pp. 753–761.

Xu et al., "Resilient Multicast Support for Continuous–Media Applications", *Proceedings of the Sixth International Workshop on Network and Operating System Support for Digital Audio and Video*, (May 1997), pp. 1–12.

Yajnik et al., "Packet Loss Correlation in the MBone Multicast Network", *Proceedings of IEEE Globecom '96*, (Nov. 1996).

Li et al., "Layered Video Multicast with Retransmissions (LVMR): Evaluation of Hierarchical Rate Control", (believed to be no earlier than May 1997), pp. 1–26.

Khansari et al., "Approaches to Layered Coding for Dual–Rate Wireless Video Transmission", (believed to be no earlier than 1994).

Han et al., "Multi–Resolution Layered Coding for Real–Time Image Transmission: Architectural and Error Control Considerations", to appear in *Academic Press*, (believed to be no earlier than Mar. 1996), pp. 1–18.

Ghanbari, "Postprocessing of Late Cells for Packet Video", *IEEE Transactions on Circuits and Systems for Video Technology*, vol. 6, No. 6, (Dec. 1996), pp. 669–678.

FIG. 13a

| packet number | frame number | packet# in a frame | received Y/N | received time (ms) |
|---|---|---|---|---|
| 0 | 1 | 0 | Y | 201 |
| 1 | 1 | 1 | Y | 450 |
| 2 | 1 | 2 | Y | 600 |
| 3 | 1 | 3 | N | * |
| 4 | 1 | 4 | Y | 980 |
| 5 | 2 | 0 | Y | 1100 |
| 6 | 2 | 1 | Y | 1305 |
| 7 | 3 | 0 | N | * |
| 8 | 3 | 1 | Y | 1790 |
| 9 | 3 | 2 | N | * |
| 10 | 3 | 3 | Y | 2100 |
| 11 | 4 | 0 | N | * |
| 12 | 4 | 1 | N | * |
| 13 | 5 | 0 | Y | 2710 |
| 14 | 5 | 1 | Y | 3000 |

FIG. 13b

| packet number | frame number | packet# in a frame |
|---|---|---|
| 0 | 1 | 0 |
| 1 | 1 | 1 |
| 2 | 1 | 2 |
| 3 | 1 | 3 |
| 4 | 1 | 4 |
| 5 | 2 | 0 |
| 6 | 3 | 1 |
| 7 | 2 | 2 |
| 8 | 2 | 3 |
| 9 | 3 | 0 |
| 10 | 3 | 1 |
| 11 | 3 | 2 |
| 12 | 3 | 3 |
| 13 | 4 | 0 |
| 14 | 4 | 1 |

FIG. 13c

| packet number | frame number | packet# in a frame | received Y/N | received time (ms) |
|---|---|---|---|---|
| 0 | 1 | 0 | Y | 201 |
| 1 | 1 | 1 | Y | 450 |
| 2 | 1 | 2 | Y | 600 |
| 3 | 1 | 3 | N | * |
| 4 | 1 | 4 | Y | 980 |
| 5 | 2 | 0 | Y | 1100 |
| 6 | 3 | 1 | Y | 1305 |
| 7 | 2 | 2 | N | * |
| 8 | 2 | 3 | Y | 1790 |
| 9 | 3 | 0 | N | * |
| 10 | 3 | 1 | Y | 2100 |
| 11 | 3 | 2 | N | * |
| 12 | 3 | 3 | N | * |
| 13 | 4 | 0 | Y | 2710 |
| 14 | 4 | 1 | Y | 3000 |

SYSTEM AND METHOD OF ERROR CONTROL FOR INTERACTIVE LOW-BIT RATE VIDEO TRANSMISSION

TECHNICAL FIELD

The present invention relates to video conferencing systems and methods. More specifically, the present invention relates to error control techniques for interactive low-bit rate video transmission over the internet.

RELATED ART

The idea of internet video conferencing has become popular due to the explosion of internet users and advancements in video compression technology. High-quality video conferencing over the internet, however, remains challenging because of frequent video packet loss, real-time application requirements, and current bandwidth constraints. Since input video stream sources are inherently bursty, packet loss is bound to occur in limited bandwidth systems.

Most standard video compression coding schemes, such as H.261, H.263, and MPEG, are not designed for real-time transmission over a lossy packet switched network, but primarily for video storage, e.g., CD or VHS tape. Although these schemes are capable of high compression efficiency, packet loss severely degrades video reception quality. This degradation is due to motion compensation techniques used by coders and decoders (hereinafter "codecs") for removing temporal redundancy in video streams. Motion compensation removes inter-frame temporal redundancy by encoding only a pixel difference or a prediction error between a current image and a previously transmitted image often referred to as a reference frame. A single occurrence of packet loss can introduce an error in a reference frame, which can propagate and get amplified in subsequent frames as more packets are lost.

Error propagation is controlled by adding temporally independent intra-rames to the video stream on a more frequent basis. However, the compression efficiency of an intra-frame is 3 to 8 times worse than an inter-frame. Increasing the frequency of intra-frames increases the bandwidth requirement. Often, the bandwidth requirement is increased too much for internet video transmission. Nevertheless, severe degradation of image quality due to packet loss error propagation has forced several video conferencing codecs to adopt an even more drastic approach. Using a technique called conditional replenishment, codecs filter out blocks that have not changed significantly from the previous frame and intra-code the remaining blocks. Since coded blocks are temporally independent, packet loss affects only those frames that are contained in lost packets. However, this enhanced error resilience comes at the expense of lower compression efficiency. Since conditional replenishment can be applied to any video coding schemes, additional compression can be obtained, if temporal redundancy is removed from each coded block, by coding only each block's prediction error.

Retransmission-based error recovery (REC) provides improved error resilience without incurring significant bandwidth overhead because packets are retransmitted only when they are indicated lost. Retransmission does involve transmission delays, however, and has been known to be ineffective for interactive real-time video applications such as internet video conferencing. Many have proposed the use of extended control or playout times to allow retransmitted packets to arrive in time for display. This implies that the playout time of a frame is delayed by at least three one-way trip times after initial transmission, two for packet transmissions and one for a retransmission request. Under current internet conditions, such a delay would be intolerable for interactive video applications.

Retransmission can still be a very effective technique, however, for improving error resilience in interactive real-time video conferencing. The present invention proposes a new REC scheme, called periodic temporal dependency distance (PTDD). In the PTDD scheme, frames are displayed as they are decoded using normal playout times. If a packet fails to arrive before the playout time of its frame, the displayed frame will contain some distortion. However, late packets can still be used to improve subsequent video quality because their frames are used as reference frames for temporally dependent frames. Rather than discarding late packets, PTDD uses the late arriving retransmitted packets to restore frames even though these frames have already been displayed. Restored frames are then used to reconstruct temporally dependent frames.

To allow enough time for retransmitted packets to arrive before frames are referenced for reconstruction of dependent frames, the PTDD scheme extends the temporal dependency distance (TDD) of frames. The TDD of a frame is defined to be the minimum number of frame intervals (or inter-frame delay) between a frame and a previous frame on which it is temporally dependent. In the PTDD scheme, every $p^{th}$ frame (called a periodic frame) has an extended TDD while the other frames have a TDD of 1 frame. The extension of TDD does not affect playout times of frames since playout times of frames are determined solely by inter-frame delays and the initial control time which is used to reduce delay jitter. In the PTDD scheme, the TDD of periodic frames is determined by the estimated delay between the sender and the receiver.

Retransmission alone can not protect every frame. For instance, non-periodic frames which have a TDD of 1 frame are not protected by retransmission. If packet loss occurs for a non-periodic frame, the frame will be displayed with an error which can be propagated to subsequent frames until the next periodic frame is received. The receiving video quality may periodically fluctuate somewhat reducing the overall video fidelity. To remedy this, a layered coding technique called quality assurance layering (QAL) is applied to non-periodic frames. QAL divides video signals into essential signals and enhancement signals. Essential signals are protected by a simple forward error correction (FEC) technique. By protecting only essential signals, FEC effect is maximized with respect to video quality under a given amount of packet loss. Since the quantity of essential signals is often much smaller than that of the entire signal, with only a little FEC redundant information, relatively strong video quality can be maintained.

QAL uses motion compensation to achieve good compression efficiency. In QAL, frames are temporally dependent only on the essential signals of their reference frames. This way, if some packets are lost which pertain to enhancement signals of reference frames, dependent frames are successfully restored only if essential signals of reference frames are received correctly. However, QAL has its own limitations. First, since frames are motion-compensated only to essential signals of their reference frames, the temporal redundancy present in enhancement signals is not exploited, resulting in low compression efficiency. Second, under heavy packet loss, even essential signals can be lost, causing error propagation. These limitations, however, are overcome when QAL is used in conjunction with PTDD. When used with PTDD, the QAL layering technique yields reasonably good compression efficiency since periodic frames temporally depend on the entire signal of their reference frames. This dependency is safe because retransmission recovers lost packets pertaining to reference frames before reconstruction. In addition, periodic frames eliminate error propagation because immediately succeeding non-periodic frames use the periodic frames as reference frames.

In the present invention, retransmitted packets do not have to arrive in time for display to be useful. The construction of motion-compensated codecs such as H.261 and MPEG reveals the correct image reconstruction of a current playout depends on successful receipt of previous reference frames. Thus, although a frame may not arrive in time for its display (due to loss or delay), the lost or delayed frame is still useful for reconstruction of successive frames, whose playout time is later than the delayed frame. In other words, if a packet is lost, then the packet can be retransmitted and arrive after the frame that the packet belongs to is played out. If the retransmitted packet arrives before the reconstruction of subsequent frames, however, the distorted frame can be repaired and used as a clean reference frame for the next frame thereby preventing errors in the reference frame from propagating forward.

One earlier use of retransmission to recover data in continuous media transmission was retransmission for the recovery of lost audio packets. It has been shown that by adding a small playout delay at the receiver, retransmission was effective over high-speed networks for protecting a voice stream from packet loss. Although less than a 200 ms round trip delay is required for high quality voice applications, delays up to 600 ms are tolerable by human ears.

A similar technique using extended playout delay has been applied to asynchronous transfer mode (ATM) video transmission. The performance of video transmission over an ATM network that uses both retransmission and error concealment to recover from errors due to cell loss was analyzed. It was disclosed that for a coast-to-coast ATM connection, a 33 ms to 66 ms playout time is sufficient to achieve a significant improvement in image quality.

Various other techniques involving retransmission-based error control for continuous media applications have been applied over an ATM connection and shown effective for small round trip delays. These include selective repeat, retransmission expiration, and conditional retransmission.

Retransmission schemes for distributing MPEG-coded video over a best-effort network such as the internet have been used in the recovery of lost packets in a video multicast transmission. By transmitting different frame types (I, P and B frames) of MPEG to different multicast groups, a simple layering mechanism was implemented in which a receiver can adjust frame playout times during congestion by joining or leaving a multicast group. For instance, consider a MPEG picture pattern: IBBPBBPBBPBB. By delaying the playout time of each frame for one frame interval, the playout time of a frame is extended by one frame interval. This delayed playout time is termed the adaptive playback point. If a receiver leaves the B frame group because of congestion, the adaptive playback point is additionally extended by three frame intervals. In other words, a P frame can be displayed after three frame intervals from its reception. The scheme has been shown effective for non-interactive real-time video applications. This technique, however, may not be useful for interactive real-time video applications because of the possibility of long playout times.

In a multicast conference group, different participants may have different service requirements. Some participants may require real-time interactions with other participants, while others may merely wish to watch or record the video stream. Retransmission can be effectively used for the transmission of high quality video to the receivers that do not need a real-time transfer of video data. A new protocol termed structure-oriented resilient multicast (STORM) was designed in which senders and receivers collaborate to recover from lost packets using a dynamic hierarchical tree structure.

A forward error correction scheme known as priority encoding transmission (PET) has been applied to hierarchically encoded MPEG video. A temporal layering scheme was used in which reference frames (e.g., I frames and P frames) were given a higher priority than other temporally dependent frames (e.g., B frames). Since B frames are temporally dependent on P and I frames which are more reliably received, this technique effectively suppresses error propagation. However, in low bit rate video conferencing, the frequency of I and P frames must be kept very low because of their low compression efficiency (typically 3 to 8 times lower than that of B frames). Thus, the resulting images can be very jerky as packets are being dropped to affect B frames. If the frequency of I and P frames has to be increased, then the amount of redundant bits added by PET also increases.

A priority packetization scheme has been applied to an MPEG encoded video stream for ATM transmission. A frequency truncation technique was applied in which a fixed number of DCT coefficients of each DCT block are allocated to the HP (high priority) data. It was shown that by utilizing this type of packetization, basic image quality can be maintained if the HP stream is guaranteed to be received. However, it does not solve the error propagation problem because essential signals of a frame are still temporally dependent on both the essential and enhancement signals of its reference frame. Since the decoded enhancement signals are more often erroneous, frames that depend on enhancement signals can perpetuate the same error.

INTRA-H.261 is used in some internet video conferencing tools that encode each frame as an intra-frame. Using a conditional replenishment technique, the INTRA-H.261 codec is shown to yield excellent error resilience with respect to packet loss. Another benefit of the INTRA-H.261 codec is the simplicity of encoding since encoding does not involve a decoding or prediction loop.

In quality assurance layering (QAL) errors due to loss of LP (low priority) packets do not propagate because each frame is temporally dependent only on the essential signals of its reference frame which are assumed to be reliably received. The effect of two different priority packetization techniques similar to frequency truncation and energy threshold has been studied. It was shown that the energy threshold method performs slightly better than frequency truncation when the HP stream uses about 50% of the total bandwidth allocated.

Similar layering techniques to QAL have also been proposed. In such techniques, each frame is first decimated to produce a low-resolution image, then the low-resolution image is coded using H.261 or a DCT-based codec and packetized as HP data. The original image is then compared with the decoded frame of its low-resolution frame to produce a difference image which is coded using a different codec and packetized as a LP data. This coding scheme will have similar error resilience as the QAL technique since the LP data is temporally dependent only on the HP data. However, this codec could be computationally more demanding because in addition to the initial filtering, two types of encoding are performed on the same frame.

QAL has been applied to video transmission over a mobile network to solve the fading problem commonly experienced during a hand-off period. By keeping the size of the HP stream large (about 83% of the total bandwidth), video quality, even under fading, can be kept comparable to that during normal operation. Priority layering techniques are also applied to still JPEG image transmission. A frequency truncation layering technique that partitions DCT blocks of JPEG encoded frames into essential (consisting of the DC coefficients) and enhancement (consisting of all the AC coefficients) layers has been used. The effectiveness of layered coding through the hierarchical mode of JPEG was studied and yielded a statistical analysis showing the overhead of the coding method can be insignificant.

DISCLOSURE OF THE INVENTION

Retransmission has been generally ineffective for interactive video transmission over the internet. The present invention challenges this view by presenting several retransmission-based error control schemes that are useful for real-time interactive applications. In particular, the schemes do not require artificial extension of frame playout delay, and thus are suitable for interactive applications. The schemes take advantage of the motion prediction loop employed in most motion compensation-based codecs. By correcting errors in a reference frame due to earlier packet losses through retransmission, the schemes significantly prevent error propagation resulting from originally lost packets. Since a reference frame can be arranged to be referenced for the construction of the current image much later than the display time of the frame, the delay in receiving retransmitted packets is effectively masked out so that the retransmitted packets are used to restore the reference frame.

Many motion compensation prediction-based codecs, such as MPEG, and H.261, are useful for internet interactive video transmission despite previously discussed drawbacks. Some of the drawbacks of motion compensated codecs include computational complexity, error resilience, tight coupling between the prediction state at the encoder and that at the decoder, and compute-scalable decoding. The present invention shows that H.261 equipped with REC schemes achieves comparable error resilience to that of INTRA-H.261, and combined with a priority layering coding technique, yields better video quality than INTRA-H.261. under the same bit rate and loss rate. Other disadvantages can be overcome with relatively simple modifications to the codecs. For instance, compute-scalable decoding is achieved by decoding only periodic frames and shedding off the computational load for decoding non-periodic frames in PTDD. If the distance between two periodic frames is too large, the display image may look too jerky. However, by having several different types of periodic frames, each of which has a different TDD, this problem is overcome.

Having identified some of the disadvantages of motion-compensated codecs, it should be emphasized that one of their advantages over INTRA-H.261 is better compression efficiency. Although INTRA-H.261 yields reasonably good error resilience, the low compression efficiency of INTRA-H.261 makes it difficult to obtain high quality video for a low bit rate transmission. Consider that in a multicast group, although some receivers want interactivity, others are just watching or recording the transmitted video. These passive observers want the highest quality that the video source can give. At the same time, they may have only a small amount of the bandwidth allocated for their video. If the video source already sends a reduced low quality video just to match their bandwidth, these receivers will not get the highest quality. On the other hand, if INTRA-H.261 has to increase the quality, then it has to use a lot of bits, which would increase its bandwidth requirement beyond what is available for these receivers. Note that this feature is different from media scaling where receivers with a higher network capacity always get a higher quality image. In the present invention, this feature allows receivers with a low network capacity to get high quality by giving up interactivity. Motion compensated codecs equipped with a REC scheme provide this feature as they generally yield greater compression efficiency while accommodating interactive users with improved error resilience.

In terms of computation complexity, the scheme of the present invention adds more computation at the decoder because reference frames need to be restored should error occur. H.261 cannot compete with INTRA-H.261 with respect to complexity because INTRA-H.261 reduces the complexity of the encoder and decoder substantially by removing the motion prediction loop. In terms of error resilience, H.261 can be modified to yield improved error resilience even under non-trivial loss rates. The modified scheme does not require frequent Intra-frame updates and effectively eliminates error propagation due to packet loss.

The present invention is advantageous because a forward error correction (FEC) scheme by itself may not be as effective for internet video transmission due to potential bursty losses of video packets. Bursty losses can make error-free reconstruction of a frame impossible and error can be propagated to succeeding frames despite successful recovery of lost packets for those succeeding frames. However, combined with the proposed scheme of the present invention, a FEC scheme can be very useful since FEC reduces retransmission and since a successfully recovered reference frame which was lost in a bursty loss is used to build the next clean frame which is also recovered by a FEC scheme.

It is an object of the present invention to develop an error recovery scheme that solves the error propagation problem without losing significant compression efficiency.

Some of the objects of the invention having been stated, other objects will become apparent as the description proceeds, when taken in connection with the accompanying drawings described as follows:

BRIEF DESCRIPTION OF THE DRAWINGS

FIG. 13 shows a trace mapping of an actual trace to a packet sequence;

DETAILED DESCRIPTION OF THE INVENTION

Figure 1:
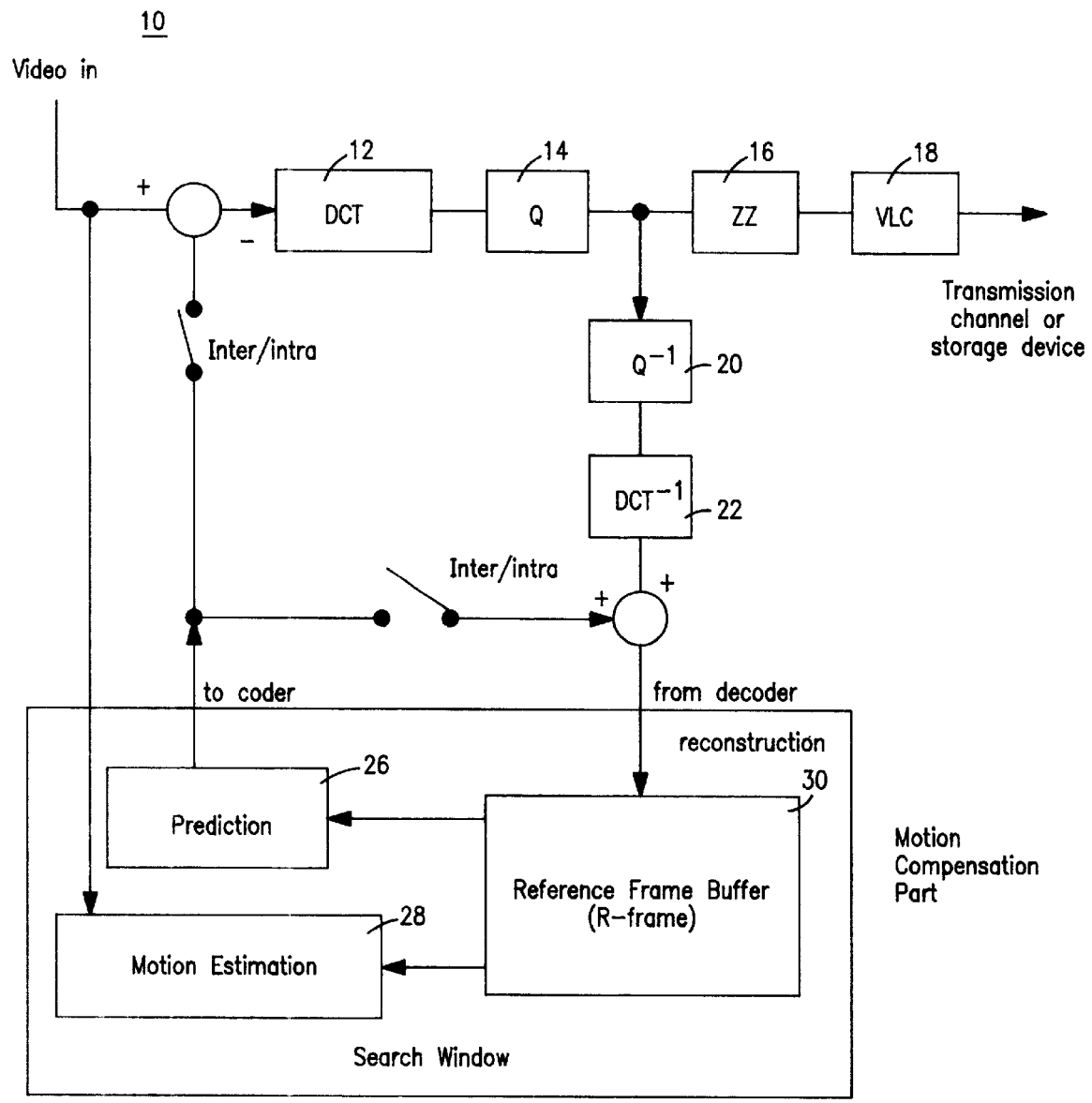
FIG. 1 is a schematic drawing illustrating an H.261 encoder.

The present invention is described more fully hereinafter with reference to the aforementioned drawings, in which preferred embodiments of the invention are shown. This invention may, however, be embodied in many different forms and should not be construed as limited to the embodiments set forth herein.

As will be appreciated by those skilled in the art, the present invention may be embodied as a method, a data processing system, or a computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including, but not limited to, hard disks, CD-ROMs, optical storage devices, or magnetic storage devices.

The present invention is described below with reference to flowchart illustrations of methods, apparatus (systems) and computer program products. It will be understood that each block in any flowchart illustrations, and combinations of blocks in any flowchart illustrations, can be implemented by computer program instructions. These computer program instructions may be loaded onto a general purpose computer, special purpose computer, or other programmable data processing apparatus to produce a machine, such that the instructions when executed on a computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions when executed on a computer or other programmable apparatus provide steps for implementing the functions specified in the flowchart block or blocks.

Accordingly, blocks of flowchart illustrations support combinations of means for performing the specified functions, combinations of steps for performing the specified functions and program instruction means for performing the specified functions. It will also be understood that each block of flowchart illustrations, and combinations of blocks in flowchart illustrations, can be implemented by special purpose hardware-based computer systems which perform the specified functions or steps, or combinations of special purpose hardware and computer instructions.

LIST OF ACRONYMS USED THROUGHOUT THE TEXT

| | |
|---|---|
| ATM | Asynchronous Transfer Mode |
| CODEC or codec | Coder/Decoder |
| DCT | Discrete Cosine Transformation |
| FEC | Forward Error Correction |
| H.261 | A Coder/Decoder Image Compression Scheme |
| H.263 | A Coder/Decoder Image Compression Scheme |
| HL.261 | A Coder/Decoder Image Compression Scheme |
| HP | High Priority |
| HP.261 | A Coder/Decoder Image Compression Scheme |
| HPF.261 | A Coder/Decoder Image Compression Scheme |
| HPL.261 | A Coder/Decoder Image Compression Scheme |
| INTRA-H.261 | A Coder/Decoder Image Compression Scheme |
| INTRAL-H.261 | A Coder/Decoder Image Compression Scheme |
| JPEG | Joint Photographic Experts Group - A Standard Compression Format for Color Images |
| LP | Low Priority |
| MPEG | Motion Pictures Experts Group - A Compression Format for a Series of Images |
| NACK | No Acknowledgment |
| PET | Priority Encoding Transmission |
| PSNR | Peak Signal-to-Noise Ratio |
| PTDD | Periodic Temporal Dependency Distance |
| QAL | Quality Assurance Layering |
| REC | Retransmission Based Error Control |
| STORM | Structure Oriented Resilient Multicast |
| TDD | Temporal Dependency Distance |

The retransmission-based error control (REC) scheme of the present invention is based on how video frames are encoded in most motion compensation-based codecs. FIG. 1 illustrates the H.261 coding standard 10 which describes a video coding method for video stream transmission at rates of p×64 Kbits/s, where $1 \leq p \leq 30$. The first video frame (an intra, or I frame) is divided into fixed-size blocks, each of which is then transformed by a discrete cosine transform (DCT) function 12 into a block of orthogonal frequency coefficients. These coefficients are quantized (Q) 14, coded by an entropy coder (ZZ/VLC) 14, 18 and then transmitted over the network. The frame is also reconstructed in the same manner. It is decoded by the receiver ($Q^{-1}$, $DCT^{-1}$) 20, 22 and stored in a frame buffer called the reference frame or R frame 30. The following frame, a predictive, or P frame 26, is compared to the R frame to generate a motion vector 28 for each block. A new image is constructed solely from the motion vectors and R frame. The prediction error between the reconstructed new image and the original image is encoded in the same manner as the I frame. The motion vector and the encoded prediction error for each block are then transmitted. Although FIG. 1 shows only the encoding portion of the codec, the procedures involving $Q^{-1}$, $DCT^{-1}$, and the reconstruction of the R frame are duplicated in a decoder Most of the previously proposed retransmission schemes work as follows. When a frame packet is lost at the receiver, the receiver detects the loss after receiving a packet subsequent to the lost packet and sends a retransmission request to the sender. Upon receiving the request, the sender retransmits the packet. If the retransmitted packet arrives before the frame's playout time, the frame can be fully restored. If the packet arrives after its display time, it is discarded and the frame is displayed with some error, and all subsequently decoded frames will carry the same error until a new I frame is received. The corresponding R frame will contain the same error, and any subsequent temporally dependent frames will also contain the same error until the R frame is restored.

Figure 2:
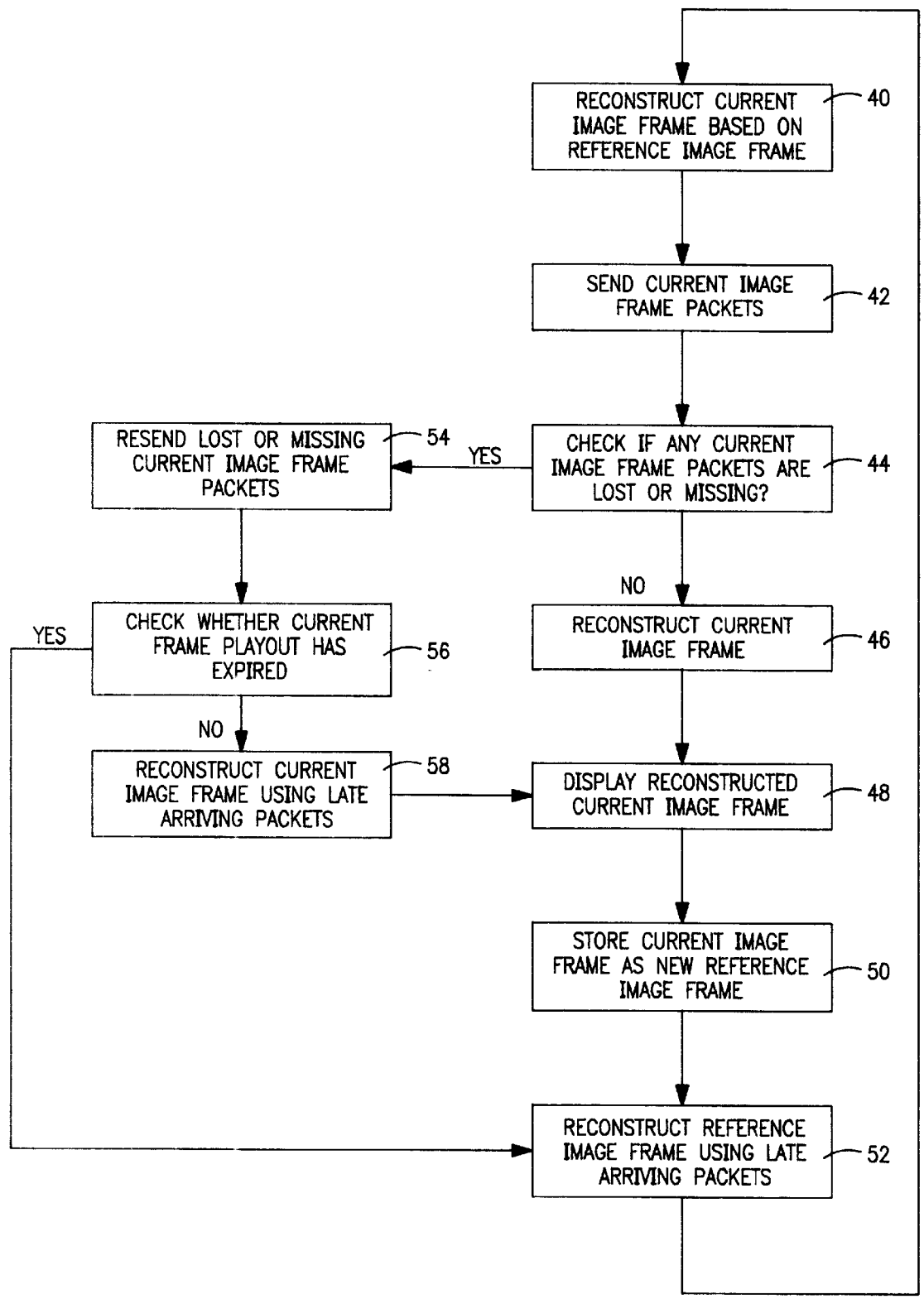
FIG. 2 is a block diagram illustrating the retransmission scheme of the present invention.

The retransmission scheme of the present invention is illustrated in FIG. 2. Video transmission begins by reconstructing the current image frame based on the reference image frame 40. This is true except for initial frame transmission and intra-frame transmission, both of which have no reference frame. Upon reconstruction, the current image frame packets are sent 42. The receiver then checks if any of the current image frame packets were lost during transmission 44. If not, the current image frame is reconstructed 46. Upon reconstruction the current image frame is displayed 48. If, however, it has been determined that one or more packets were lost, a NACK is sent and retransmission of the lost packets is requested 54. The lost packets are retransmitted and upon receipt, a check is made to determine whether the frame's original playout time has expired 56. If not, the retransmitted packets are used in reconstructing the current image frame 58 prior to being displayed 48. After being displayed, the reconstructed current image is stored and redesignated as the new reference image 50. If the check performed on the current frame's playout time 56 did return a status of expired, then the retransmitted frames are unable to be used for current frame reconstruction. These frames are not, however, discarded as useless. Rather, they are combined with the newly designated reference image frame 52 in order to reconstruct the reference image frame eliminating errors. This improved reference image frame is then used as a basis for subsequent frames in the transmission sequence for reconstructing the next image frame 40.

The scheme of the present invention differs from the previously proposed schemes in that it utilizes the concept that retransmitted packets do not have to arrive before the frame's playout time to be useful. In motion compensation-based codecs, correct image reconstruction of the currently displayed frame depends on successful reconstruction of previous R frames. Thus, while subsequent frames to an R frame are being reconstructed, the late packets of the R frame can still be decoded and used for restoring the R frame. This eliminates error propagation because the next frame is reconstructed from the restored R frame without error. Moreover, this method of retransmission does not require an extension of playout delay.

Figure 3:
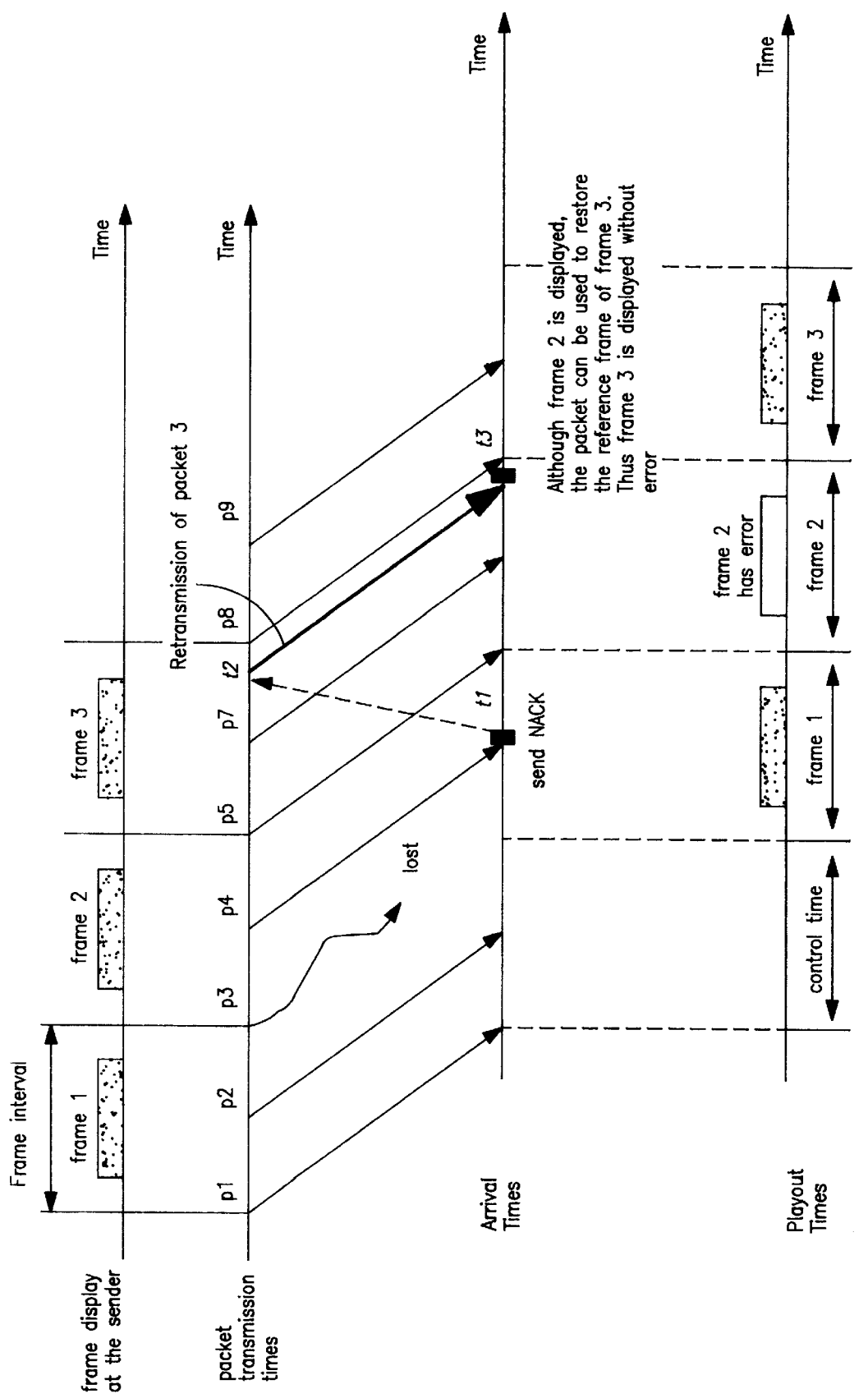
FIG. 3 is a schematic illustrating error recovery in a video stream having two packets per frame.

FIG. 3 illustrates error recovery in a video stream having two packets per frame. Packet 3 is lost and the receiver receives packet 4 at time $t_1$ and recognizing that packet 3 was not received, sends a retransmission request (NACK) to the sender. The sender gets the NACK at time $t_2$ and transmits packet 3 again. The retransmitted packet arrives at time $t_3$ which is before frame 3 is displayed. Packet 3 is now used to restore the R frame of frame 3 so that frame 3 can be decoded and displayed without error. A small amount of control time delay (one or two frame intervals) is customarily used before the display of the first frame to reduce the effect of network delay jitter in most video conferencing tools.

Figure 4:
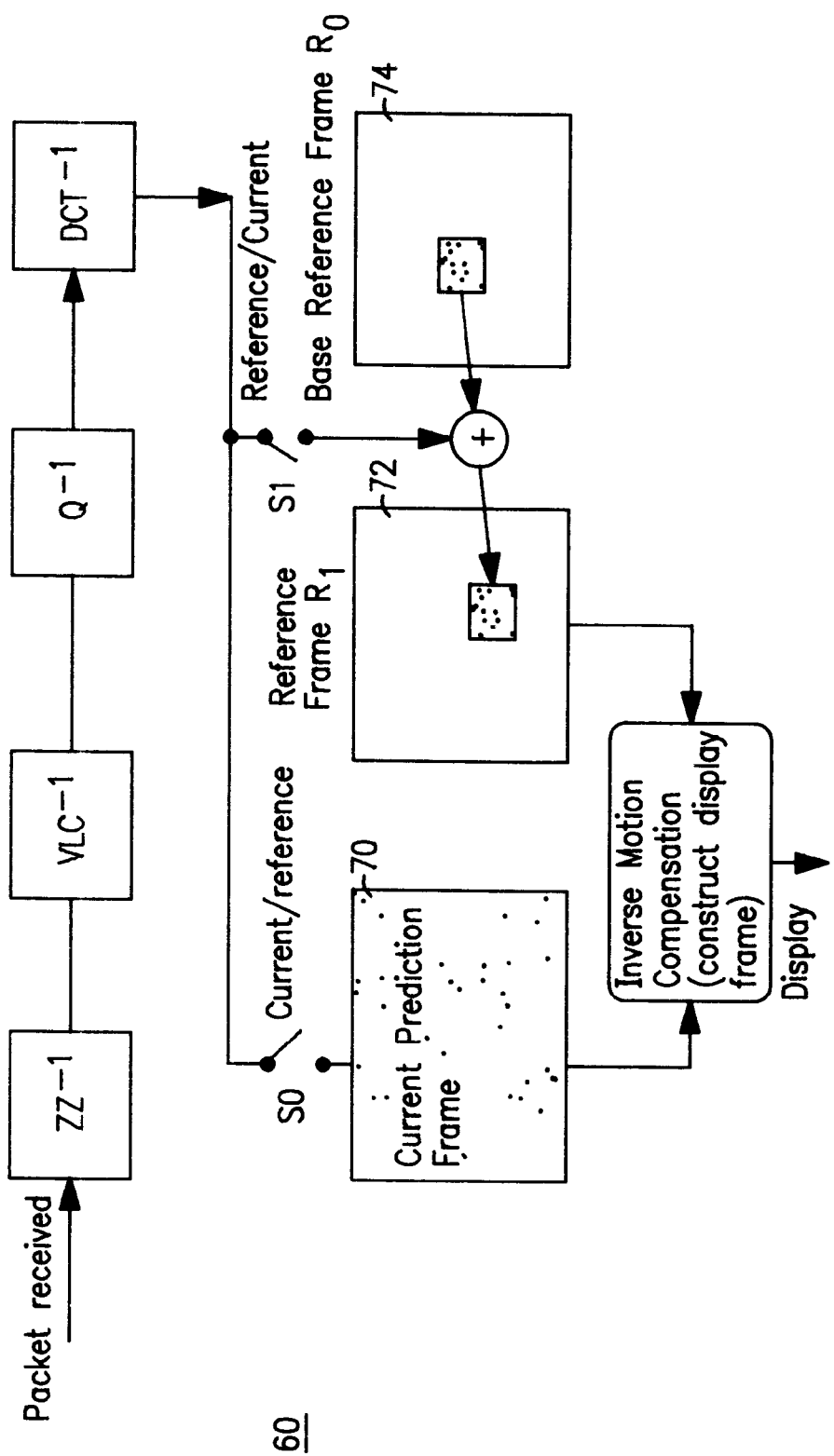
FIG. 4 is a schematic drawing illustrating an H.261 decoder modified to handle recovery of R frames through retransmitted packets.

A simple modification of the decoder is sufficient to use retransmission for interactive video transmission. FIG. 4 shows a H.261 decoder 60 modified to handle recovery of R frames through retransmitted packets. An additional frame buffer has been added to the original H.261 decoder to handle the recovery. When a packet is received and decoded into an image block, the decoder 60 determines whether the block belongs to the current frame being decoded or its reference frame. If the packet is for the current frame, then the block is stored into frame buffer CP 70 along with its motion vector. If the packet is for the reference frame, the block is added to its temporally dependent block in frame buffer $R_0$ 74 and stored into $R_1$ 72. CP 70 contains only the prediction error and motion vectors of the current frame while $R_1$ 72 contains the fully motion compensated image of the reference frame of the current frame while $R_0$ contains the reference frame of $R_1$. $R_0$ is termed the base reference frame 74. At display time, the current frame is constructed using the information in CP 70 and $R_1$ 72. After display, $R_1$ 72 is copied to $R_0$ 74 and the displayed image is copied to $R_1$ 72. In this scheme, if the retransmitted packet of $R_1$ 72 arrives before the reconstruction of the current frame, the late arriving packet can be used to construct the current frame without error. The deadline of a packet can be informally defined to be the arrival time of the packet at the receiver after which it is not useful in decoding any frame.

Thus, although a frame may not arrive in time for its display (due to loss or delay), the delayed frame is still useful for reconstruction of successive frames, whose play-out times occur later than the delayed frame. The frame will likely contain some image distortion. However, if the retransmitted packet arrives before the reconstruction of the next frame, the distorted frame is repaired and used as a clean reference frame for the next frame. This prevents errors in the reference frame from further propagating to subsequent frames.

Below, we discuss three different REC schemes that extend the deadlines of lost packets without affecting the play-out times of frames. Many different variations of the schemes are also possible.

Cascaded Buffering

Figure 5:
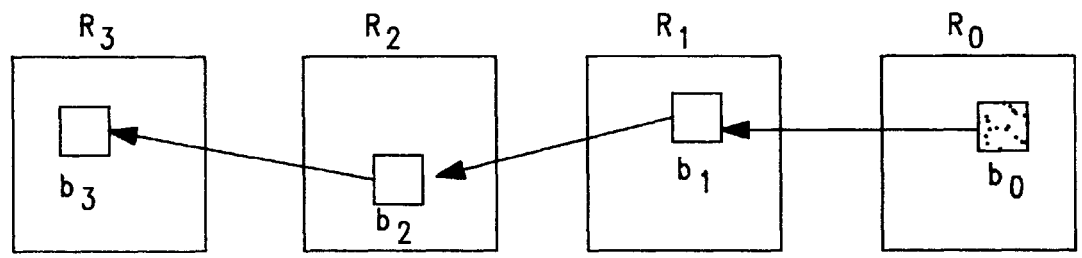
FIG. 5 is a schematic illustrating a cascaded buffering retransmission error control scheme.

In H.261, each R-frame is dependent on its previous R-frame. Thus, by employing more R-frame buffers, the late packets can be decoded and used to restore their corresponding R-frames. FIG. 5 illustrates this scheme, called cascaded buffering. The shaded squares represent image blocks and the arrows represent the temporal dependency among blocks. For example, block $b_3$ depends on block $b_2$ and so on. Suppose that the current frame's sequence number is f. $R_0$ is the base reference frame and contains the completely reconstructed picture of frame f-4 while $R_i$-frame ($i \geq 1$) contains decoded prediction error and motion vectors of its frame (f-4+i). The image block that corresponds to $b_3$ can be constructed by adding $b_0$, $b_1$, $b_2$ and $b_3$ We call this scheme cascaded buffering However this scheme has two obvious drawbacks. First it may require many frame buffers if the message delay is too long or the frame interval is too short. Second, it may require too much extra computation at the time of constructing the display image because it needs to add all the temporally dependent blocks.

Extended Temporal Dependency Distance

Figure 6:
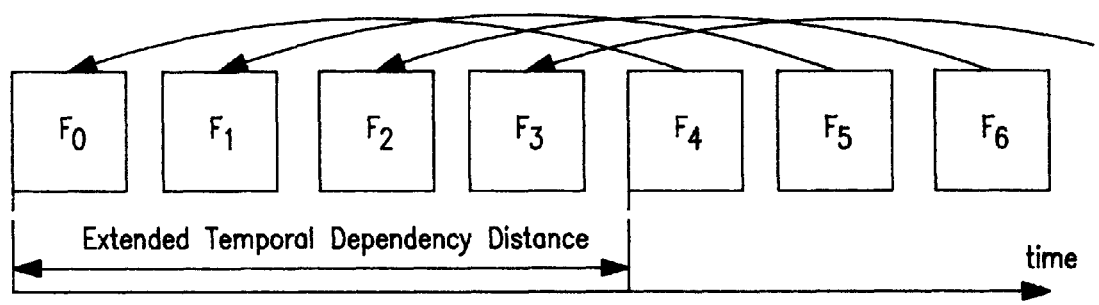
FIG. 6 is a schematic illustrating an extended temporal dependency distance retransmission error control scheme.

Another way to extend the deadline is to increase the temporal dependency distance (TDD) of a frame which is defined to be the minimum number of frame intervals between that frame and another frame on which it is temporally dependent. For instance, all the inter frames in H.261 have a TDD of 1. FIG. 6 shows an example where all the frames have a TDD of 3. Each frame is temporally dependent on another sampled at three frame intervals away. The extended TDD effectively stretches the deadlines of packets because the packets can arrive before their frames are referenced for the decoding of the next frames which happens after one TDD period. We call this scheme extended TDD (ETDD).

In ETDD, a receiver needs to maintain twice as many frame buffers as the cascaded buffering scheme. Because each frame within a TDD period depends on a frame in the previous TDD period, the receiver has to maintain all the reference frame buffers within a TDD period for the decoding of the frames in the next TDD period. In addition, to restore each R-frame through retransmission, each reference frame should have one base reference frame that contains the fully reconstructed reference frame of frame as shown in Figure. However, the ETDD scheme does not have as much computational overhead as the cascade buffering scheme because each R-frame contains fully reconstructed image and the current decoded frame can be directly reconstructed from its R-frame. This scheme may have another drawback. Since the prediction error of each frame is obtained from the frame that is at three frame intervals away, it may lower the compression efficiency. However, in a video conferencing, typical "talking head" does not move much from frame to frame and a motion estimation algorithm normally detects motion within a 16×16 pixel window. A short TDD such as 3 to 5 frame intervals would not affect compression efficiency too much. A larger TDD, however, would considerably reduce compression efficiency.

Periodic Temporal Dependency Distance

Figure 7:
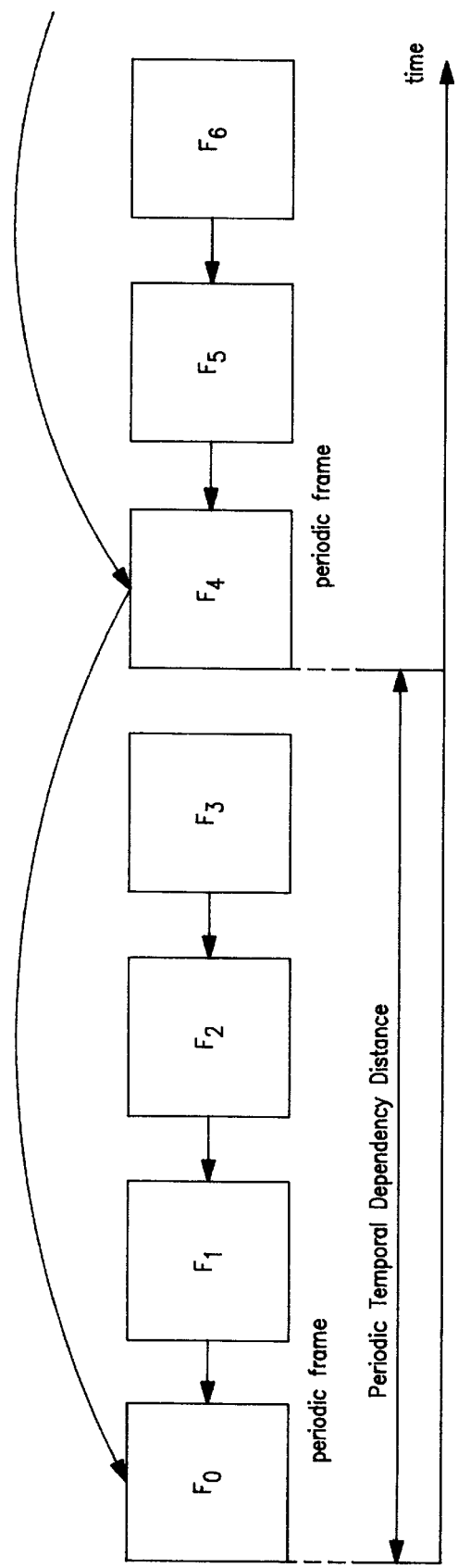
FIG. 7 is a schematic illustrating a periodic temporal dependency distance retransmission error control scheme.

FIG. 7 illustrates a scheme called periodic temporal dependency distance (PTDD). For PTDD, every $i^{th}$ frame has an extended TDD of "i" frames (we call this frame a periodic frame) while all the other inter-frames have a TDD of 1. The TDD of periodic frames in FIG. 5 is four. In fact, the pattern of the temporal dependency is very similar to a picture group pattern of MPEG. All frames with a TDD of four can be regarded as P frames while the other frames can be regarded as B frames (except the first frame). Thus, this scheme is easily incorporated into MPEG. PTDD does not incur much computational overhead and does not require many additional frame buffers.

Only two additional buffers are needed to store the R frames of the next periodic frame.

One drawback of PTDD is that it does not provide protection for non-periodic frames. An error in a non-periodic frame will propagate until the next periodic frame is received. There is tradeoff between packet deadline and the extent of error propagation. A long TDD of period frames can prolong error propagation among non-periodic frames. However, it allows more time for periodic frames to be recovered.

PTDD+Layered Coding

Error resistance for non-periodic frames can be improved by employing a layered coding scheme that packetizes encoded frames into essential (high priority) and enhancement (low priority) signals. Although layered coding was originally developed for a network paradigm such as ATM and RSVP, where a certain amount of bandwidth can be reserved, it can also be used over a best-effort network such as the internet provided the HP stream can be protected by forward error correction. In order for the scheme to be successful over the internet, the HP stream should be kept small to reduce the bandwidth required to protect the stream because the size of redundant information introduced by FEC is proportional to the size of the HP stream.

Figure 8:
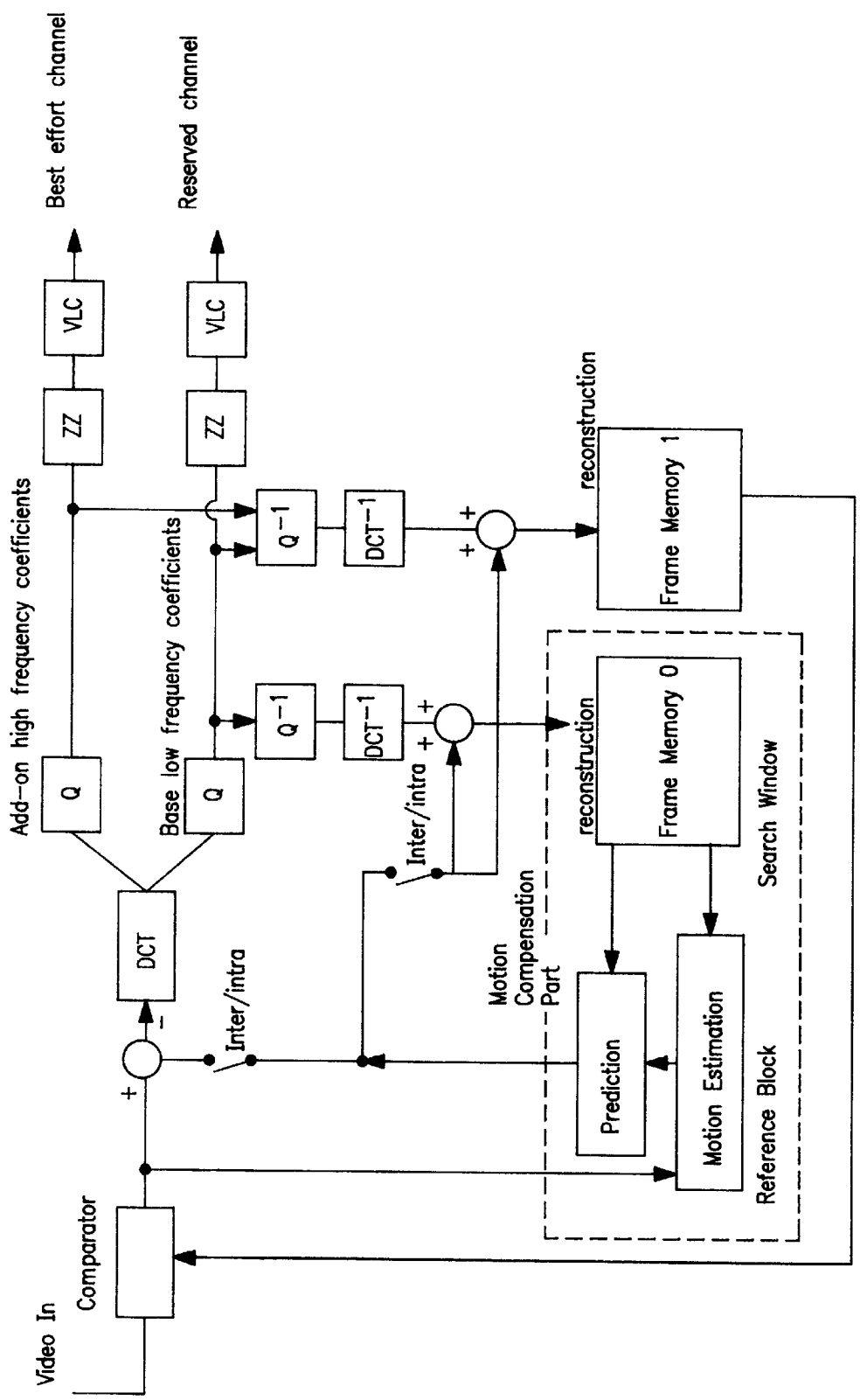
FIG. 8 is a schematic drawing illustrating a QAL modified H.261 encoder.
Figure 9:
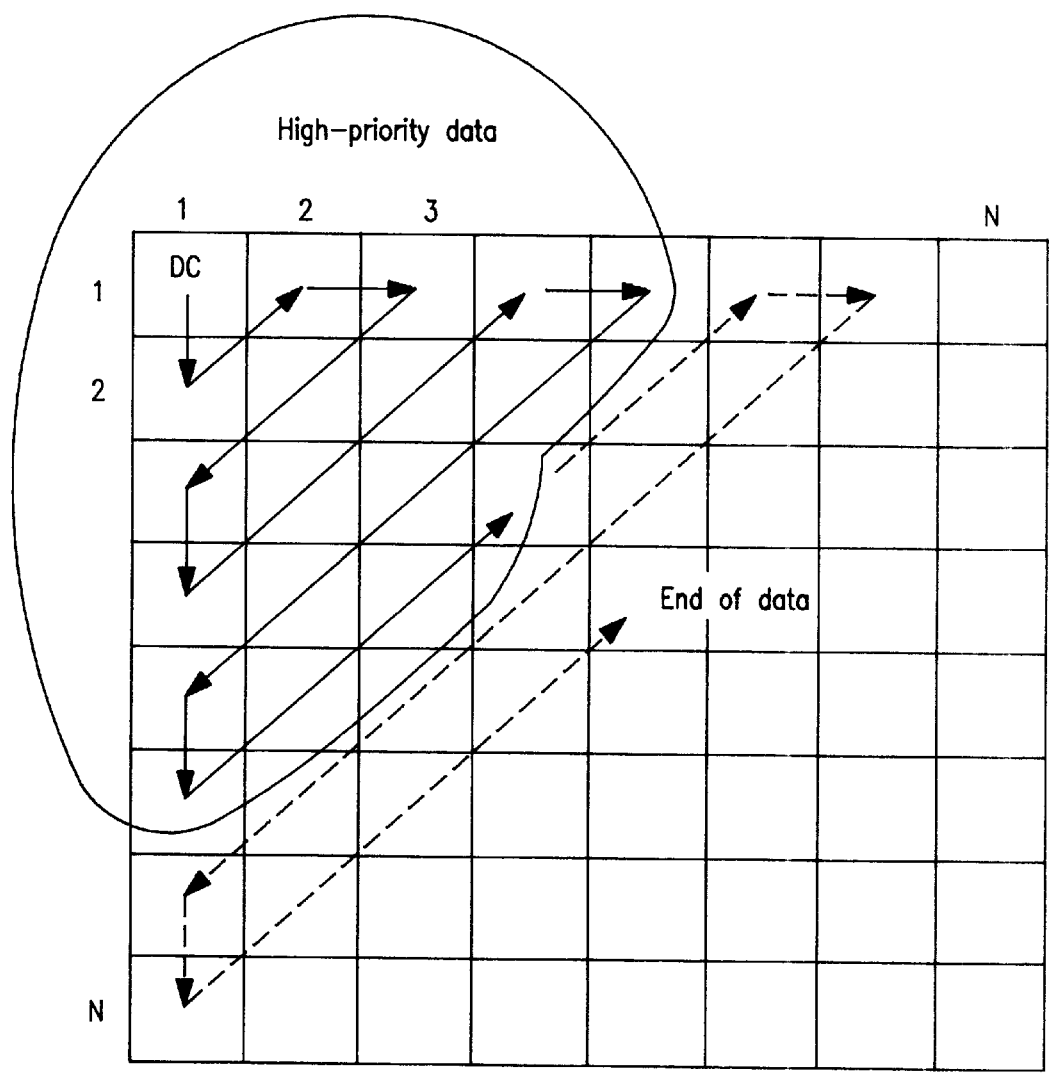
FIG. 9 is a schematic illustrating layer partitioning of DCT coefficients.

A version of quality assurance layering (QAL) is shown in FIG. 8. It is a modification of a H.261 encoder and augmented with priority packetization and conditional replenishment. After DCT coefficients are quantized (Q), they are partitioned into HP and LP layers as described in FIG. 9. For a fixed nonzero integer b less than 64, the first b coefficients are allocated to the HP layer, and remaining coefficients are allocated to the LP layer. The subsequent inter-frame and the currently encoded frame are used to perform motion estimation and conditional replenishment for encoding the next frame. The motion vectors and the HP coefficients of the current frame are used to reconstruct a predicted frame. The difference between the subsequent frame and the predicted frame is encoded. In the scheme, each frame temporally depends only on the essential signals of its reference frame. Since a frame is reconstructed from the essential signals of its reference frame, an error in the enhancement signals of the reference frame caused by packet loss does not carry over. Thus, even if all LP stream packets are discarded, a certain level of video quality can be maintained.

QAL, however, has not yet been proved to yield good compression efficiency. The difficulty lies in the tradeoff between compression efficiency and the amount of redundant information added by FEC. If the HP stream does not contain enough signals, there are not many temporally redundant signals between the reference frame reconstructed from the essential signals and the current frame to be encoded. On the other hand, if more coefficients are added to the HP stream, the HP stream gets larger and so does the redundant information added by FEC to protect the HP stream. Due to low compression efficiency, QAL has been traditionally used in situations where large portions of bandwidth can be allocated to the HP stream (about 50% to 80% of total bandwidth). In the current internet environment, this may not be reasonable.

Figure 10:
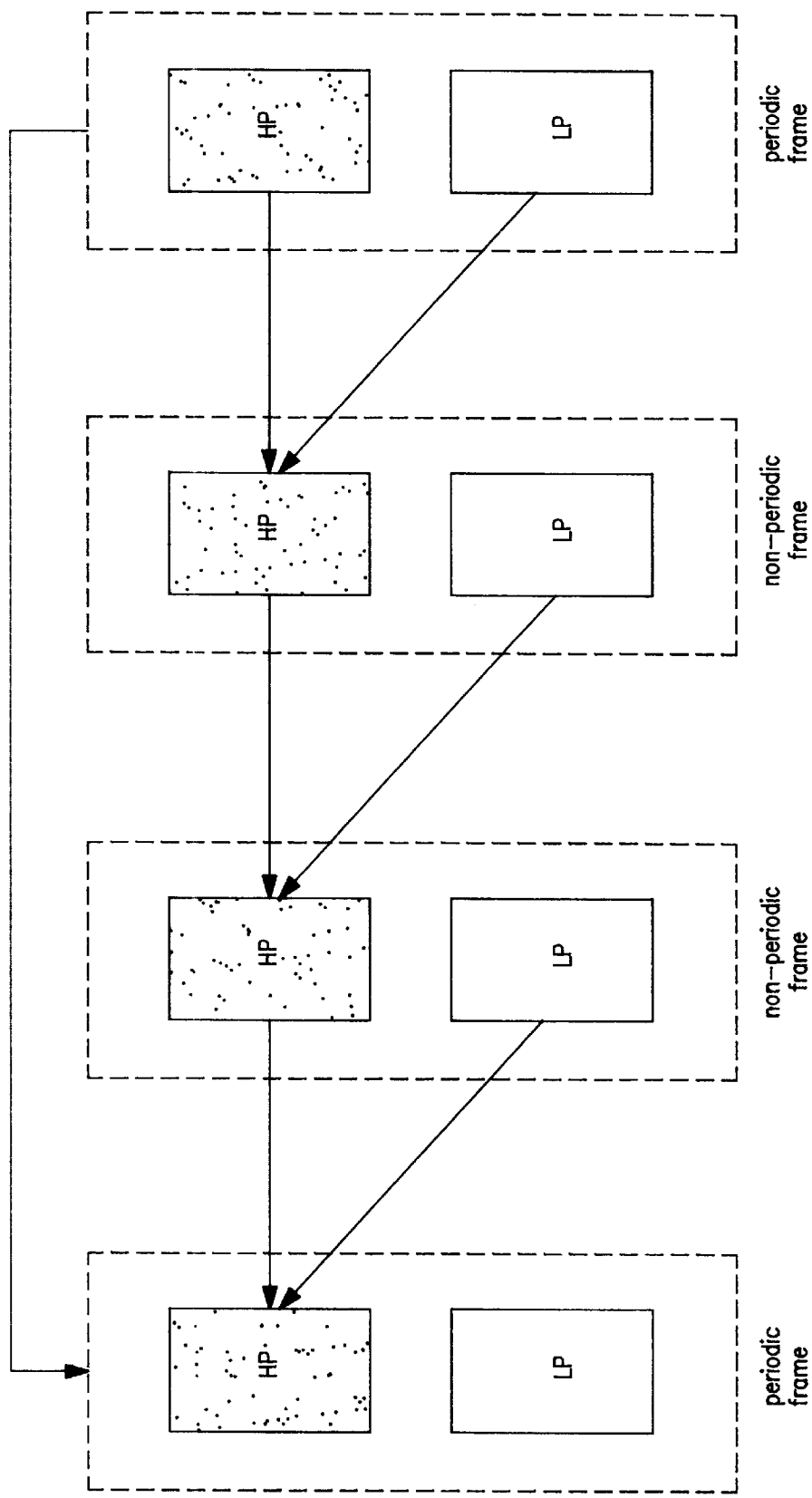
FIG. 10 is a schematic illustrating a temporal dependency chain in layered PTDD.

PTDD provides a good compromise for these conflicting requirements. In PTDD, periodic frames are protected by retransmission. In most cases, both the essential and enhancement signals of periodic frames are restored by retransmission before reconstruction of their next periodic frames. Thus, by allowing periodic frames to exploit the temporal redundancy present in both the essential and enhancement signals of their reference frames, good compression efficiency is achieved. Even with a small percentage of bandwidth allocated to the HP stream, QAL combined with PTDD achieves good compression efficiency. Note that non-periodic frames use only the essential signals of their reference frames including the ones immediately following periodic frames. So, when a periodic frame is displayed with some error due to packet loss in the LP stream, its dependent non-periodic frames are not affected. FIG. 10 illustrates a chain of temporal dependency in a layered PTDD scheme.

Under heavy or bursty packet loss, even the HP stream loses packets since FEC cannot provide adequate protection for the HP stream.

Unfortunately, packet loss in the HP stream introduces errors in the essential signals of reference frames, causing error propagation. Thus, QAL alone is not very effective over a best effort network where no guarantee on the packet loss behavior can be made. However, QAL combined with PTDD does effectively suppress error propagation. Errors occurring in non-periodic frames due to loss in the HP stream do not propagate beyond the next periodic frame assuming that lost packets for the current periodic frame are recovered by retransmission before reconstruction of the next periodic frame.

Experimental Results

Several experiments were conducted to show that PTDD is an effective error control scheme for real-time interactive video transmission over the internet. Transatlantic and Transpacific internet video transmission experiments were conducted originating from the United States (east coast). H.261 was used as a base case for comparison purposes. Three variants of H.261 PTDD (HP.261, HPF.261, HPL.261) were implemented. Each differs from the other in the manner that non-periodic frames are protected. HP.261 provides no protection for non-periodic frames; HPF.261 protects non-periodic frames by adding one Exclusive-OR parity packet (size 512 bytes) to each frame; and HPL.261 applies QAL where the HP stream is protected by adding one Exclusive-OR parity packet (size 512 bytes) to each frame.

In addition, QAL (without PTDD) was implemented based on H.261 as described in FIG. 1. This implementation is called HL.261. INTRA-H.261, known for good error resilience over packet loss, was also implemented. For each frame, INTRA-H.261 intra-codes every image block changed significantly from the corresponding block in the previous frame. The remaining blocks are not coded. Lastly, INTRAL-H.261 was implemented. INTRAL-H.261 combines layered coding with INTRA-H.261 where the DCT coefficients of each coded block are divided into the HP and LP streams. Again, one parity packet is added to each frame to protect the HP stream. In all the implemented layered codecs, 5 DCT coefficients of each DCT block are coded as essential signals and the remaining as enhancement signals.

A test video sequence was obtained from a typical video conferencing session in which a talking head engages in a conversation with another party. The video frames were sampled at 5 frames/sec and each frame was captured in the CIF YUV color format (352×288). This video-sampling rate obtained a bit rate suitable for intercontinental transmission without imposing too much load on the network. Considering the long distance between the testing sites and the size of the input video images, this frame rate was not unusual. The target bit rate was approximately 250 Kbits/sec. In addition to the controlled sampling rate, a conditional replenishment technique for all the tested schemes to obtain a desired bit rate was used. For each 16×16 macro block at position (x,y) in the current frame, the following test was performed for conditional replenishment.

$$CR < \sum_{i=0}^{16} \sum_{j=0}^{16} |p(x+i, y+j) - p'(x+i, y+j)|$$

CR is a conditional replenishment threshold, and p(x,y) and p'(x,y) are the pixel values at position (x,y) of the current and previous frames. If this condition is true, the macro block is encoded. Otherwise, CR is adjusted to get a desired bit rate.

About a 40 second sequence (190 frames) was obtained as the input video stream test sequence. The video sequence was replayed several times for a five-minute period for each experiment. Replay did not affect the integrity of the experiment because the first frame is always intra-coded without conditional replenishment in all the tested codec schemes. The 95th frame is also intra-coded with conditional replenishment to remove any artifact due to decoder drift effect. Each codec scheme used a default quantization step size of 8, and each motion compensation-based codec used a full-search motion estimation technique over a pixel window size of 15 by 15. The TDD of the periodic frames in HP.261, HPF.261 and HPL.261 was set at 5 frame intervals allowing packet deadlines containing periodic frames to be extended up to 1 second.

Figure 11:
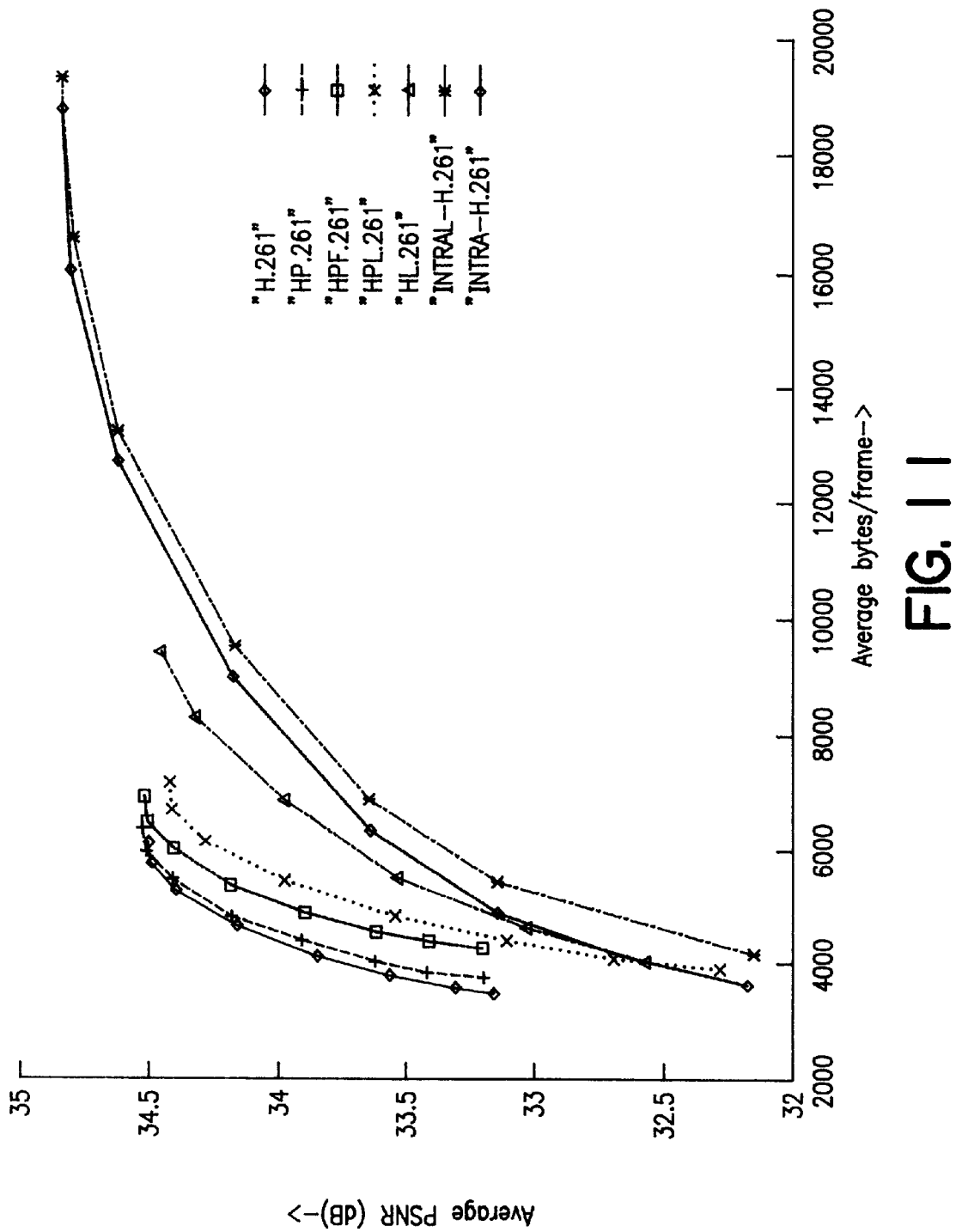
FIG. 11 is a schematic illustrating the compression efficiency of various codec schemes.

The compression efficiency of various codec schemes for the input test sequence was measured using average peak signal-to-noise ratio (PSNR) of decoded frames over various data rates. The data rate was measured by the average number of bytes required to compress a frame (FIG. 11). It was shown that for a given data rate, INTRA-H.261 and INTRAL-H.261 yielded the worst video quality while H.261 yielded the best. To achieve the same quality, INTRA-H.261 required more bandwidth than the other motion compensation-based codecs. For instance, to obtain about 34 dB PSNR, INTRA-H.261 required 80% (11 KB/6 KB) more bits per frame than H.261.

HL.261 yields only slightly higher compression efficiency than INTRA-H.261. This is because the HP stream of HL.261 does not contain many coefficients, and only the essential signals of reference frames are used for motion compensation in HL.261. On the other hand, HPL.261 yields excellent compression efficiency. In HPL.261, although non-periodic frames are encoded the same as in HL.261, each periodic frame is motion-compensated to the full signal of its reference frame. Thus, periodic frames are compressed very well. The fidelity of the essential signals of the periodic frames is relatively high compared to the frames in HL.261 contributing to the reduction of the decoder drift effect for non-periodic frames.

Figure 12:
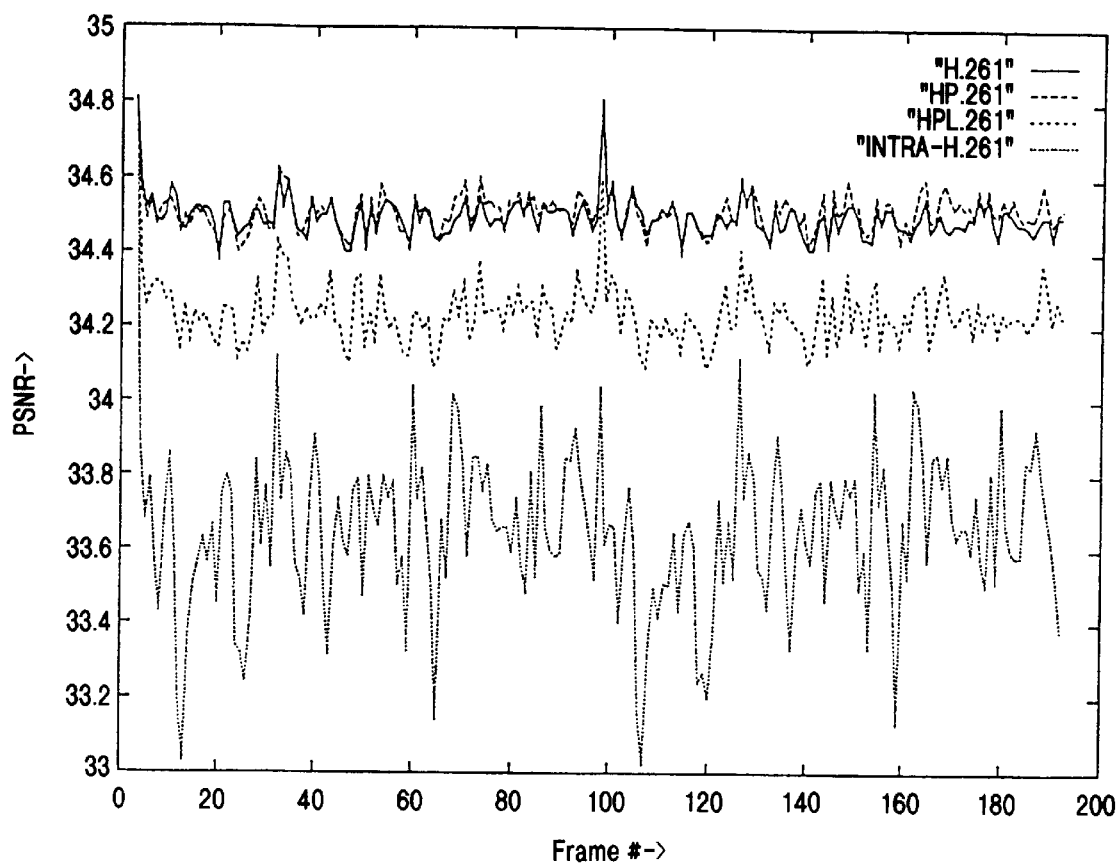
FIG. 12 is a graphical representation of video quality for four encoded sequences.

Each scheme used a similar bandwidth for transmission. Since H.261 yields the best compression efficiency, the target bit rate was selected as the bit rate of H.261. H.261 yields a maximum PSNR at approximately 240 Kbits/s. 250 Kbits/s was selected as the transmission rate and the bit rates of other schemes were matched to this bit rate. Table 1 shows the selected data rate of each codec along with the ratio of the bit rate of the HP stream over the total bit rate, and the ratio of the redundant bit rate induced by FEC over the total bit rate for each scheme. HP.261, HPF.261, and HPL.261 are given slightly lower data rates because retransmission of lost packets may increase the actual data rate. FIG. 12 shows the PSNR of each frame compressed by four different schemes under the target bit rate specified in Table 1.

TABLE 1

CHOSEN DATA RATES FOR NETWORK EXPERIMENTS AND THEIR AVERAGE PSNR

| Compression Scheme | Avg. bit rate Kbits/s | FEC (%) | HP (%) | Avg. PSNR |
|---|---|---|---|---|
| H.261 | 240.6 | 0 | 0 | 34.50 |
| HP.261 | 232.6 | 0 | 0 | 34.51 |
| HPF2.61 | 234.2 | 8.6 | 0 | 34.41 |
| HL.261 | 252 | 8 | 33 | 33.978 |
| HDL.261 | 239.3 | 8.4 | 26 | 34.20 |
| INTRA-H.261 | 247.77 | 0 | 0 | 33.65 |
| INTRAL-H.261 | 252.77 | 8.1 | 27 | 33.49 |

Internet Experiments

The test video sequence was first compressed using each codec and then packetized into approximately 512 byte packets. Only the packetized sequences of HP.261, HPF.261, and HPL.261 were actually transmitted over the internet. For each transmission test, a 5-minute trace was obtained that recorded the packet sequence numbers and arrival times of all the received packets. For the other codecs, trace-driven simulations were run based on the traces obtained from the actual transmission tests of HP.261, HPF.261, and HPL.261.

Each packet of a frame was transmitted at a regular interval which was determined by the given frame rate (5 frames/s) and the number of packets within the frame. For example, for the given frame interval of 200 ms, if one frame consisted of 10 packets, a packet in the frame was transmitted at 20 ms intervals. Each transmitted packet was assigned a unique sequence number that was a positive integer incremented by one for each transmitted packet starting from 0. Retransmitted packets were given the same sequence numbers as their original packets.

The receiver sent one acknowledgment to the sender for each received frame. An acknowledgment contained information about the missing packets of the last periodic frame that the receiver received. After receiving the acknowledgment, the sender retransmitted the lost packets. A retransmitted packet was not retransmitted for about three frame intervals. The sender retransmitted the packet if it received another acknowledgment after the period indicating that the packet was lost. The receiver also did not request for the retransmission of packets whose deadlines had expired. This reduced the number of unnecessary retransmissions.

Each trace was fed to an off-line decoder to measure the signal-to-noise ratio of the received frames. To simplify the experiment, jitter control time for frame playout was not included. Each frame was considered to be displayed at the arrival of the first packet of its next frame if that packet was received. If that packet was not received, the frame was considered to be displayed at 200 ms after its previous frame's play-out time.

Trace-driven simulations were run by mapping each of the traces "T" to the packetized sequence of H.261, HL.261, INTRAL-H.261 and INTRA-H.261 as follows. A 5 minute length of a packetized sequence "S" was obtained for those schemes as if the sequence would have been transmitted in a real test. Each packet "p" in trace "T" was mapped to a packet "q" that had the same sequence number as "p". If packet "p" was received, it was recorded at "q" as received and assigned a receiving time of "p" to "q". Otherwise, it was recorded at "q" as lost. FIG. 13 illustrates this mapping.

FIG. 13(a) shows a sample trace of a HP.261 sequence (* indicates the packet was not received). Those packets received (indicated by Y) show received times. FIG. 13(b) shows a sample of a packetized H.261 sequence.

FIG. 13(c) shows the result of mapping (a) to (b). This mapping technique provides a very accurate comparison of various transmission schemes because the sequences of all the schemes are mapped to the same traces.

Computing and Network Environment

Alternatively, the experiment could have been carried out by running all the schemes at the same time, each of which sends its own video packetized sequence. However, this technique would not have given a fair comparison because the experiment cannot control the loss rate of each scheme and each scheme would have had a different loss rate and loss behavior. For example, two packets transmitted by different schemes might arrive at the receiver at different times depending on the network and computing conditions at the time of transmission. The mapping technique eliminates all these concerns.

This mapping technique cannot, however, capture the dynamics of acknowledgments and retransmissions in HP.261, HPL.261 and HPF.261. This is because an acknowledgment is transmitted by the receiver only when a new frame is received and each sequence may have a different number of packets in a frame. Thus, acknowledgments and retransmitted packets might be received at different times for different sequences. The dynamics can only be captured through a real transmission, which is why the sequences of HP.261, HPF.261, and HPL.261 were actually transmitted. The other schemes do not have this problem because they do not involve any retransmission.

Traces were classified into several loss rate groups and only the average behavior of the traces in each group is presented. Table 2 shows loss groups and their corresponding loss ranges. Since high loss cases are relatively infrequent, we set a larger range for high loss rates.

TABLE 2

LOSS RATE GROUPS AND THEIR LOSS RANGES

| Loss group | .025 | .05 | .075 | .1 | .125 | .15 |
|---|---|---|---|---|---|---|
| Loss range | [0, .025] | [.025, .05] | [.05, .075] | [.075, .1] | [.1, .125] | [.125, .15] |
| Loss group | .175 | .2 | .25 | .3 | .35 | .4 |
| Loss range | [.15, .175] | [.175, .2] | [.5, .25] | [.25, .30] | [.3, .35] | [.35, .40] |

It was found that a long burst loss is quite frequent. Although long burst losses such as the traces in the 35% loss group in HPF.261 and the 25% loss group in HP.261 are rare, a burst loss period involving 20 to 100 packets is quite common. A burst loss causes a severe image degradation of the frames received after the loss period because all temporal reference frames are lost. To handle this problem, an intra frame was sent after a long burst loss period. The receiver simply reports the burst loss length. If the length is larger than a predefined threshold, the sender compressed the next frame as an intra frame. Since the receipt of an acknowledgment indicated that at least one packet was received after the reported loss period, there was a good chance that the burst loss period was terminated.

Performance of PTDD (HP.261)

The sequences of H.261 and INTRA-H.261 are mapped to the traces of HP.261. Table 3 summarizes the result and FIG. 13 shows the average PSNR's of H.261, INTRA-H.261 and HP.261 for various loss groups.

TABLE 3

EXPERIMENTAL DATA BASED ON HP.261 TRACES

| Loss | | H.261 | HP.261 | | | INTRA-H.261 |
|---|---|---|---|---|---|---|
| Rate (%) | # of traces | Data Rate (Kbits/s) | Data Rate (Kbits/s) | Recovery by REC(%) | RTT (ms) | Data Rate (Kbits/s) |
| 2.5 | 54 | 237.2 | 246.4 | 93.39 | 192.17 | 258.1 |
| 5.0 | 40 | 245.0 | 247.2 | 96.84 | 240.97 | 256.4 |
| 7.5 | 35 | 244.6 | 248.0 | 97.01 | 236.71 | 256.7 |
| 10.0 | 14 | 245.6 | 252.8 | 79.94 | 249.19 | 256.4 |
| 12.5 | 9 | 249.1 | 262.7 | 85.67 | 329.75 | 259.9 |
| 15.0 | 8 | 251.5 | 266.0 | 68.07 | 481.28 | 260.2 |
| 17.5 | 3 | 251.4 | 268.0 | 64.60 | 429.75 | 259.8 |
| 20.0 | 2 | 252.0 | 267.0 | 62.38 | 449.28 | 260.6 |
| 25.0 | 1 | 243.6 | 241.1 | 78.53 | 215.8 | 255.4 |
| 40.0 | 2 | 248.2 | 263.6 | 52.44 | 300.6 | 257.9 |

Figure 14:
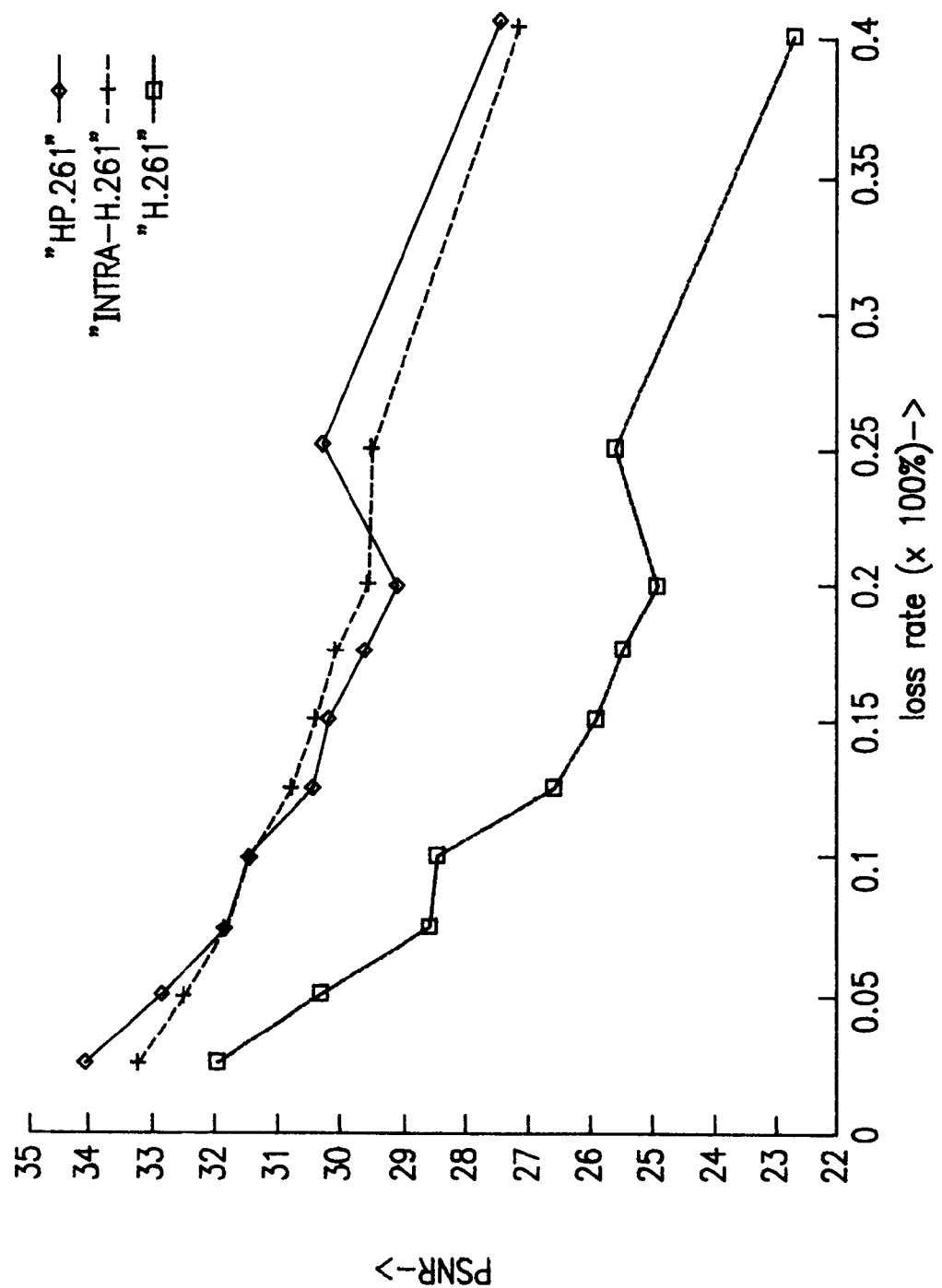
FIG. 14 is a schematic illustrating the mean PSNR of three codec schemes.

In FIG. 14, the mean PSNR of H.261 drops drastically even under small packet loss, showing the effect of error propagation. Both INTRA-H.261 and HP.261 exhibit generally good error resilience. Between 12% and 20% packet loss, the mean PSNR of HP.261 drops a littl e below that of INTRA-H.261. There are a couple of reasons for this. First is the drop in the REC recovery rates (see Table 3). There is a clear correlation between the round trip time and REC recovery rates. As round trip time delays increase, recovery rates of periodic frames drop. When round trip times increase beyond 250 ms, recovery rates by REC are significantly reduced. This is because the increased network delay reduces the probability for retransmitted packets to be received before their deadlines. Second, in HP.261, there is no protection for non-periodic frames against packet loss. Thus, as more packets are lost, more non-periodic frames suffer from error propagation. This effect is clearly visible from FIG. 15.

Figure 15:
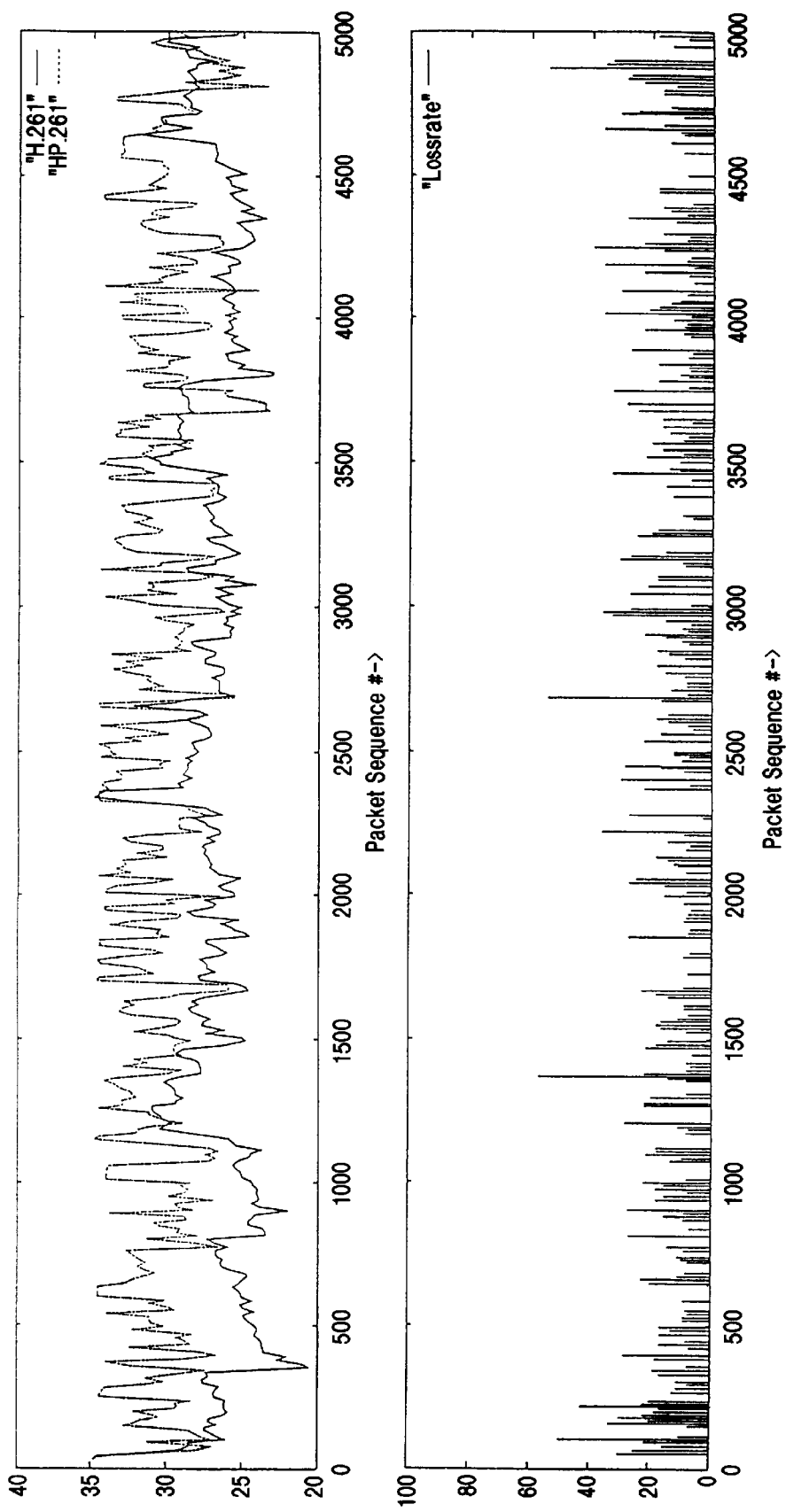
FIG. 15 is a schematic illustrating a trace of HP.261 with a 10% packet loss.

FIG. 15 shows a portion of one HP.261 trace with 10% packet loss. The figure on top compares the mean PSNR of H.261 and that of HP.261 for each frame received during the period. The figure on bottom shows impulses indicating a per-frame packet loss rate. In FIG. 15, when there is large packet loss, both H.261 and HP.261 suffer from video degradation. While H.261 does not recover from the earlier degradation even though packet loss subsides later on, HP.261 tends to bounce back from the degradation as the next periodic frames are received without loss. This means that the earlier packet loss involving some periodic frames is recovered by retransmission so that when every packet containing the next periodic frames is received, these frames can be successfully reconstructed without error. Many peaks in the graph representing the mean PSNR of HP.261 in FIG. 15 illustrate this effect. However, in many cases, the PSNR goes down immediately after its recovery and stays down until it receives the next periodic frame. This is because HP.261 does not provide any protection for non-periodic frames. When the packets pertaining to a non-periodic frame are lost, video distortion occurs, which propagates until the next periodic frame is received.

A large amount of packet loss causes many retransmissions increasing the data rates. In Table 3, the data rates for HP.261 between 12.5% and 20% go beyond 260 Kbits/s, which means on an average about 5 to 6 packets are retransmitted. These data rates are slightly higher than those of INTRA-H.261 under some loss groups.

Figure 16:
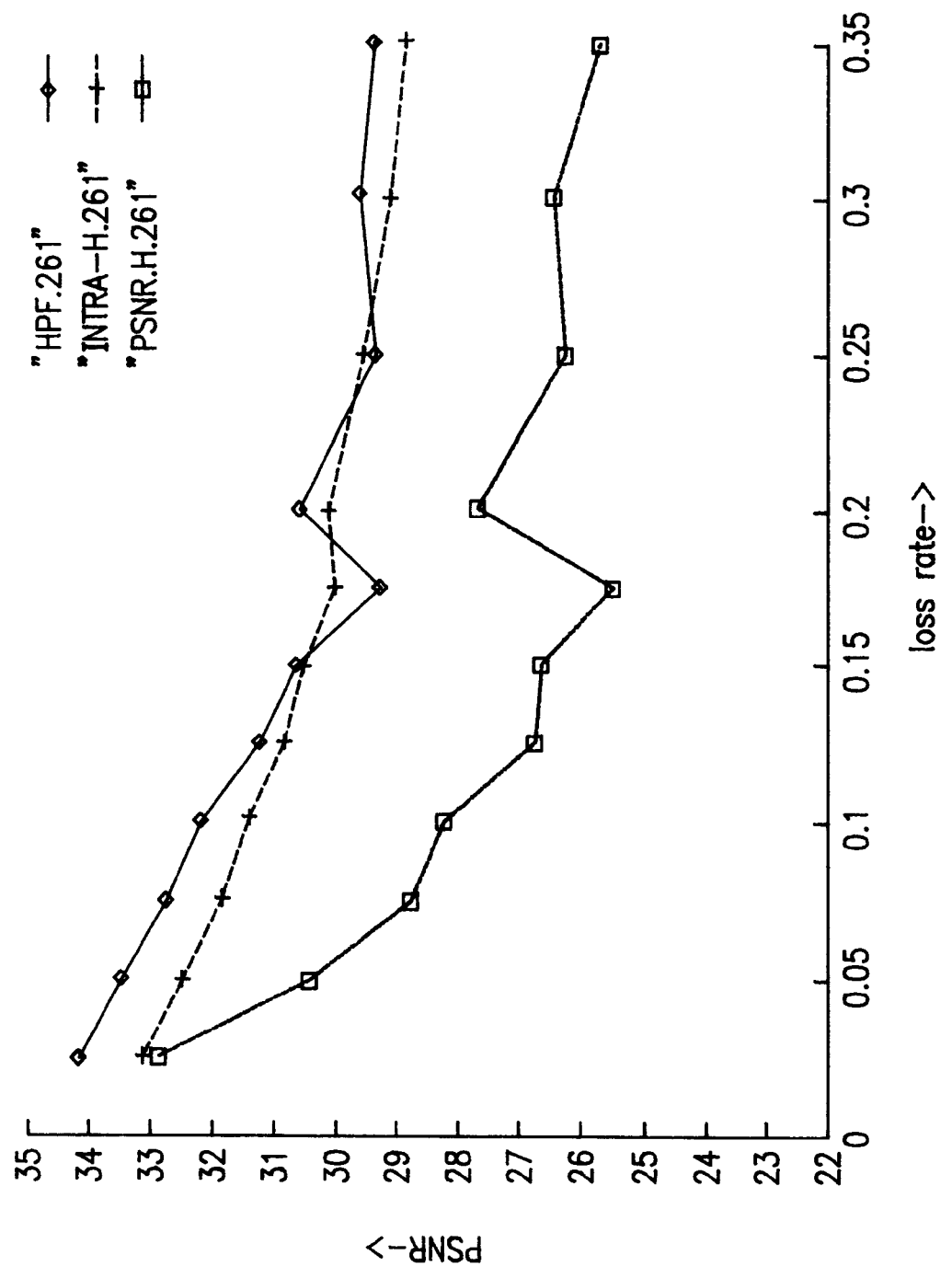
FIG. 16 is a schematic illustrating the mean PSNR of three codec schemes.
Figure 17:
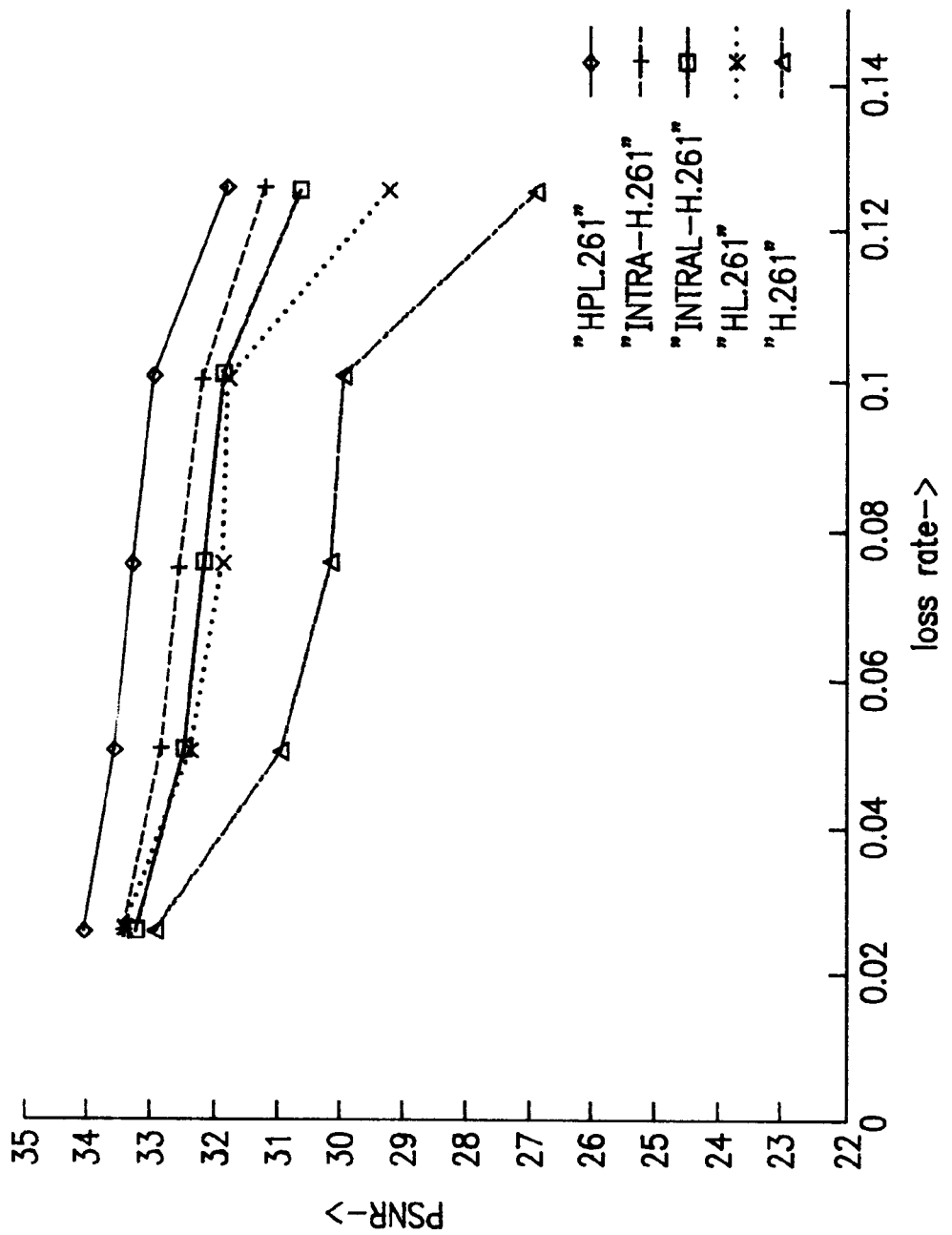
FIG. 17 is a schematic illustrating the means PSNR of five codec schemes.

FIG. 15 shows the behavior of HP.261 more clearly. It shows the PSNR of each frame in one of the traces with 10% packet loss. FIGS. 16 and 17 show respectively the recovery and loss rates of each frame in the corresponding trace. Clearly visible is that when a frame loses packets, its PSNR drops, but recovers quickly when its next periodic frame is received. When a periodic frame loses some packets, the next four frames have low image quality. However, as the periodic frame is recovered through retransmitted packets, its next periodic frame is also recovered to normal image quality.

Performance of PTDD+FEC (HPF.261)

HPF.261 uses PTDD to protect periodic frames while using FEC to protect non-periodic frames. One parity packet is added per frame to protect against one packet loss in a frame. The sequences of H.261 and INTRA-H.261 are mapped to the traces of HPF.261. Table 4 summarizes the result. FIG. 16 shows the average PSNR's of H.261, INTRA-H.261, and HPF.261 for various loss groups.

TABLE 4

| | | | | | | |
|---|---|---|---|---|---|---|
| EXPERIMENTAL DATA BASED ON HPF.261 TRACES | | | | | | |
| Loss | | H.261 | HPF.261 | | | INTRA-H.261 |
| Rate (%) | # of traces | D.R. (Kb/s) | D.R. (Kb/s) | REC (%) | FEC (%) | RTT (ms) | D.R. (Kb/s) |
| 2.5 | 24 | 247.0 | 247.9 | 89.7 | 48.88 | 188.5 | 259.0 |
| 5.0 | 42 | 246.5 | 249.1 | 96.21 | 42.23 | 197.7 | 258.5 |
| 7.5 | 32 | 245.3 | 249.6 | 96.64 | 33.77 | 223.5 | 257.3 |
| 10.0 | 14 | 245.7 | 250.8 | 84.56 | 24.46 | 239.1 | 257.6 |
| 12.5 | 14 | 249.7 | 261.9 | 81.70 | 18.77 | 325.1 | 259.7 |
| 15.0 | 9 | 249.5 | 263.3 | 57.94 | 11.78 | 388.1 | 259.0 |
| 17.5 | 6 | 250.2 | 263.7 | 50.74 | 9.37 | 437.7 | 259.3 |
| 25.0 | 5 | 250 | 261.7 | 41.9 | 5.11 | 359.3 | 260.1 |
| 35.0 | 1 | 239.8 | 245.4 | 24.96 | 6.14 | 243.5 | 251.5 |

In FIG. 16, we can see that the PSNR of HPF.261 is slightly improved from that of HP.261. HPF.261 yields slightly better PSNR than INTRA-H.261 for all loss groups except two. This improvement is mainly due to FEC. Although many packets can be recovered through FEC under small packet loss, as packet loss becomes more severe, FEC becomes ineffective. From Table 4, under less than 10% packet loss, FEC could recover from 30% to 50% packet lost. However, as more packets are dropped, the FEC recovery rate drops below 10%.

Performance of PTDD+QAL+FEC (HPL.261)

HPL.261 combines PTDD and QAL. The HP stream generated from QAL is protected by FEC. Trace-driven simulations were run on H.261, HL.261, INTRA-H.261, and INTRAL-H.261 based on the traces of HPF.261. Table 5 summarizes the result. FIG. 17 shows the average PSNR's of various schemes.

TABLE 5

| | | | | | | | | | | | |
|---|---|---|---|---|---|---|---|---|---|---|---|
| Experimental Data Based on HPL.261 Traces | | | | | | | | | | | |
| Loss | | INTRA-H.261 | INTRAL-H.261 | | H.261 | HPL.261 | | | | | |
| Rate (%) | # of traces | D.R. (Kb/s) | D.R. (Kb/s) | FEC (%) | D.R. (Kb/s) | D.R. (Kb/s) | REC (%) | FEC (%) | RTT (ms) | D.R. (Kb/s) | FEC (%) |
| 2.5 | 22 | 249 | 243 | 60.7 | 243 | 238 | 89.9 | 61.3 | 342.6 | 243 | 63.5 |
| 5 | 16 | 247 | 240 | 59.8 | 240.8 | 239 | 78.0 | 57.8 | 280.4 | 238 | 57.9 |
| 7.5 | 7 | 249 | 242 | 52.4 | 242 | 240 | 73.2 | 52.1 | 310.5 | 240 | 54.4 |
| 10 | 3 | 249 | 241 | 35.5 | 240 | 240 | 57 | 39.1 | 305.6 | 239 | 41.7 |
| 12.5 | 2 | 249 | 243 | 48.5 | 242 | 245 | 84.4 | 48.7 | 347 | 244 | 54.5 |

In FIG. 17, HPL.261 yields good error resilience, showing clear separation from INTRA-H.261. The performance of HPL.261 can be best explained from FIG. 18. As in HP.261, the PSNR of HPL.261 drops when there is heavy loss for a frame. However, it quickly bounces back when the loss rate of the subsequent frames quickly reduces. This is unlike HP.261 where rebound happens mostly around periodic frames. In addition, we clearly see many plateaus indicating that packet loss does not have much impact on the video quality of HPL.261. HL.261 performs quite well under low packet loss. As packet loss gets substantial, however, HL.261 quickly loses video quality. This is because under heavy loss, FEC protecting the HP stream becomes ineffective and the HP stream starts losing packets causing error propagation.

Figure 18:
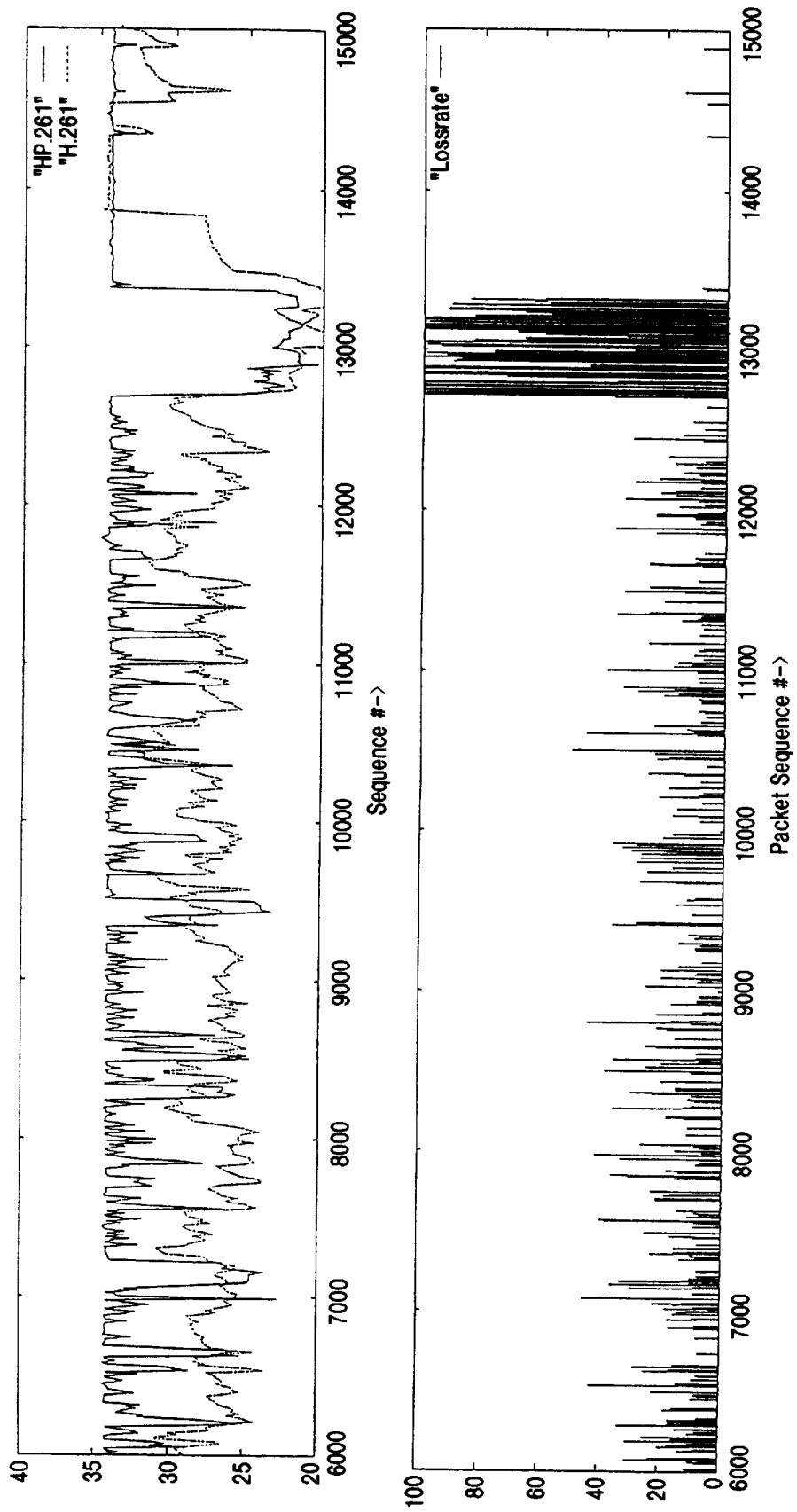
FIG. 18 is a schematic illustrating a trace of HPL.261 with a 10% packet loss.

Surprisingly, INTRAL-H.261 performs slightly worse than INTRA-H.261. This can be explained in two ways. First, the HP stream contains only 5 DCT coefficients from each coded block. These coefficients do not contain enough information to improve the receiving video quality even though they are successfully received or restored. Second, the compression efficiency of INTRAL-H.261 is lower than that of INTRA-H.261. Thus, under no or little loss, its average PSNR is always slightly lower than that of INTRA-H.261. The PSNR difference between INTRAL-H.261 and INTRA-H.261 over various loss groups seems to remain constant because of these two reasons. FIG. 18 also shows the correlation between the round trip time and the recovery loss rates: the larger the round trip time, the less the recovery rate.

Figure 19:
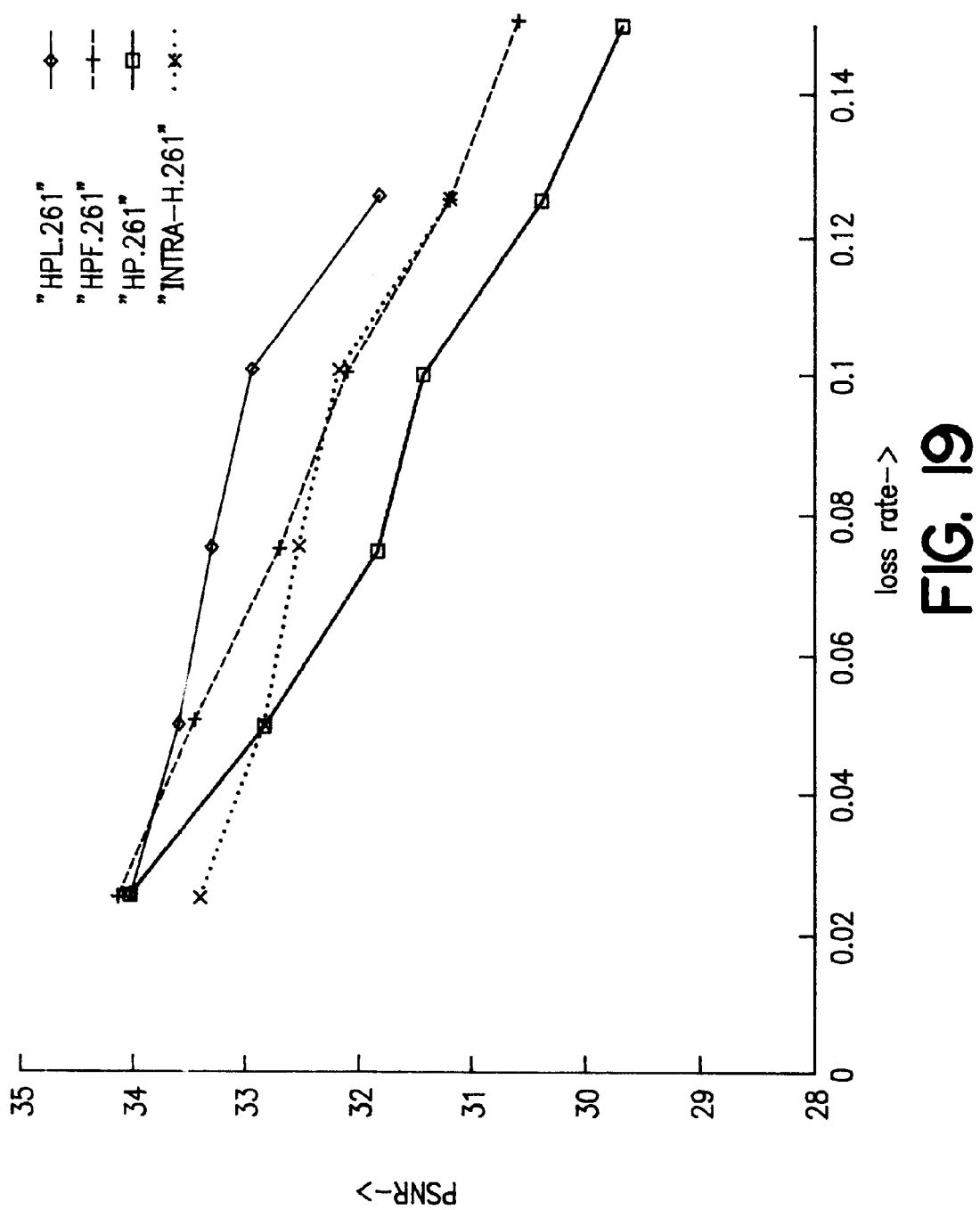
FIG. 19 compares the PSNR vs. loss rate for three codec schemes.

The mean PSNR's of REC-based codecs are compared in FIG. 19. Using the mean PSNR of INTRA-H.261 obtained from the traces of HPL.261 as a reference for comparison. From FIG. 19, HPL.261 seems to perform best. At the beginning, when there is no or little loss, HPL.261 yields the worst PSNR among REC-based codecs. However, as packet loss gets larger, HP.261 and HPF.261 quickly drops while HPL.261 sustains good video quality.

One problem with this scheme is that the frequent transmission of intra frames would increase the transmission bit rate which adds to the congestion. To mitigate the problem, the sender can send every frame as a conditionally replenished intra frame as in INTRA-H.261 for a short period until the receiver reports a smaller loss rate. Then, the sender can revert to HPF.261. This scheme would work fairly well because INTRA-H.261 yields good performance under very heavy loss rates.

The retransmission scheme(s) discussed above have been illustrated in terms of compressing natural images. The present invention, however, is not limited to natural image compression schemes. Rather, the present invention is also applicable to computer-generated graphics images (e.g., video games) and object-based coding where video images are described by a set of objects (e.g., a triangle texture map) and the movement of the objects are described by affine transformation of the objects. In all cases, motion compensation is used.

Thus, the present invention applies to any compression technique that employs motion estimation, prediction, and compensation in such way that a current image is reconstructed from any previously transmitted image information where information refers to the actual image and/or any other information such as motion prediction vectors or the like. The reconstructed image may comprise a natural textual scene and computer-generated images or simply "objects" (e.g., transparency or computer letters or subtitles).

Hardware and Software Requirements

The present invention can be implemented in a variety of computer environments including Local Area Network (LAN) and Wide Area Network (WAN) environments. The present invention can also be implemented in computer environments utilizing the TCP/IP communication protocol, such as, for instance, the internet, and environments utilizing SNA protocol. Hardware for implementing the present invention is generally consistent with typical personal computing equipment. The present invention may be implemented via other computing devices, including, but not limited to, mainframe computing systems and mini-computers.

The software of the present invention may be written in various computer languages including, but not limited to, C, C++, Smalitalk, Java, and other conventional programming languages such as BASIC, FORTRAN and COBOL.

The present invention runs on current standard desktop computer platforms such as, but not limited to, Windows®, Windows 95®, Windows NT®, UNIX®, and OS/2®. The present invention utilizes, in part, many standard features of current desktop configurations, such as the ability to store data locally, connect to the internet, and display visual information.

The present invention is not limited in scope to systems, methods and computer program products for monitoring and controlling internet video conferencing. The present invention may be utilized for monitoring and controlling various other video stream transmission systems. The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims.

In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A system for displaying an incoming stream of video images comprising:
   (a) means for receiving said stream of video images in the form of frames comprised of packets, each frame based on a reference frame, and each frame having a predesignated playout time;
   (b) means for determining whether any frame packets were lost during transmission;
   (c) means for requesting that any lost frame packets be retransmitted;
   (d) means for determining whether retransmitted lost frame packets have arrived prior to the frame's playout time;
   (e) means for reconstructing said frame using the originally transmitted frame packets and, if necessary, said retransmitted lost frame packets, provided said retransmitted lost frame packets arrived before the expiration of the frame's playout time;
   (f) display means for displaying the reconstructed frame;

(g) means for storing the just displayed reconstructed frame as said reference frame; and (h) means for reconstructing said reference frame using the just displayed reconstructed frame and said retransmitted lost frame packets that did not arrive before the expiration of the frame's playout time.

2. The system of claim 1 wherein said stream of video images is coded and compressed.

3. The system of claim 1 wherein frame playout time is extended by increasing a frame's temporal dependency distance.

4. The system of claim 3 wherein every $i^{th}$ frame has an extended temporal dependency distance while all other frames have a temporal dependency distance of one frame.

5. The system of claim 4 wherein said extended temporal dependency distance for every $i^{th}$, i being a integer, frame is variable and can be set to any number of frames.

6. The system of claim 5 further comprising means for packetizing each frame into high priority signals and low priority signals wherein only high priority signal data is used for reconstruction of a frame.

7. The system of claim 3 further comprising means for packetizing each frame into high priority signals and low priority signals wherein only high priority signal data is used for reconstruction of a frame.

8. The system of claim 1 further comprising means for packetizing each frame into high priority signals and low priority signals wherein only high priority signal data is used for reconstruction of a frame.

9. A system for displaying an incoming stream of video images comprising:

(a) means for receiving said stream of video images in the form of frames comprised of packets, each frame based on a reference frame, and each frame having a predesignated extendable playout time wherein every $i^{th}$, i being a integer, frame has a variable extended temporal dependency distance that can be set to any number of frames while all other frames have a temporal dependency distance of one frame;

(b) means for determining whether any frame packets were lost during transmission;

(c) means for requesting that any lost frame packets be retransmitted;

(d) means for determining whether retransmitted lost frame packets have arrived prior to the frame's playout time;

(e) means for reconstructing said frame using the originally transmitted frame packets and, if necessary, said retransmitted lost frame packets, provided said retransmitted lost frame packets arrived before the expiration of the frame's playout time;

(f) display means for displaying the reconstructed frame;

(g) means for storing the just displayed reconstructed frame as said reference frame; and (h) means for reconstructing said reference frame using the just displayed reconstructed frame and said retransmitted lost frame packets that did not arrive before the expiration of the frame's playout time.

10. A system for displaying an incoming stream of video images comprising:

(a) means for receiving said stream of video images in the form of frames comprised of packets, each frame based on a reference frame, and each frame having a predesignated playout time;

(b) means for packetizing each frame into high priority signals and low priority signals wherein only high priority signal data is used for reconstruction of a frame;

(c) means for determining whether any frame packets were lost during transmission;

(d) means for requesting that any lost frame packets be retransmitted;

(e) means for determining whether retransmitted lost frame packets have arrived prior to the frame's playout time;

(f) means for reconstructing said frame using the originally transmitted frame packets and, if necessary, said retransmitted lost frame packets, provided said retransmitted lost frame packets arrived before the expiration of the frame's playout time;

(g) display means for displaying the reconstructed frame;

(h) means for storing the just displayed reconstructed frame as said reference frame; and (i) means for reconstructing said reference frame using the just displayed reconstructed frame and said retransmitted lost frame packets that did not arrive before the expiration of the frame's playout time.

11. A system for displaying an incoming stream of video images comprising:

(a) means for receiving said stream of video images in the form of frames comprised of packets, each frame based on a reference frame, and each frame having a predesignated extendable playout time wherein every $i^{th}$, i being a integer, frame has a variable extended temporal dependency distance that can be set to any number of frames while all other frames have a temporal dependency distance of one frame;

(b) means for packetizing each frame into high priority signals and low priority signals wherein only high priority signal data is used for reconstruction of a frame;

(c) means for determining whether any frame packets were lost during transmission;

(d) means for requesting that any lost frame packets be retransmitted;

(e) means for determining whether retransmitted lost frame packets have arrived prior to the frame's playout time;

(f) means for reconstructing said frame using the originally transmitted frame packets and, if necessary, said retransmitted lost frame packets, provided said retransmitted lost frame packets arrived before the expiration of the frame's playout time;

(g) display means for displaying the reconstructed frame;

(h) means for storing the just displayed reconstructed frame as said reference frame; and (i) means for reconstructing said reference frame using the just displayed reconstructed frame and said retransmitted lost frame packets that did not arrive before the expiration of the frame's playout time.

12. A method of displaying an incoming stream of video images comprising the steps of:

(a) receiving said stream of video images in the form of frames comprised of packets, each frame based on a reference frame, and each frame having a predesignated playout time;

(b) determining whether any frame packets were lost during transmission;

(c) requesting that any lost frame packets be retransmitted;

(d) determining whether retransmitted lost frame packets have arrived prior to the frame's playout time;

(e) reconstructing said frame using the originally transmitted frame packets and, if necessary, said retransmitted lost frame packets, provided said retransmitted lost frame packets arrived before the expiration of the frame's playout time;

(f) displaying the reconstructed frame;

(g) storing the just displayed reconstructed frame as said reference frame; and (h) reconstructing said reference frame using the just displayed reconstructed frame and said retransmitted lost frame packets that did not arrive before the expiration of the frame's playout time.

13. The method of claim 12 wherein said stream of video images is coded and compressed.

14. The method of claim 12 wherein frame playout time is extended by increasing a frame's temporal dependency distance.

15. The method of claim 12 wherein every $i^{th}$, i being a integer, frame has an extended temporal dependency distance while all other frames have a temporal dependency distance of one frame.

16. The system of claim 11 wherein said extended temporal dependency distance for every $i^{th}$ frame is variable and can be set to any number of frames.

17. The method of claim 13 further comprising the step of packetizing each frame into high priority signals and low priority signals wherein only high priority signal data is used for reconstruction of a frame.

18. The method of claim 12 further comprising the step of packetizing each frame into high priority signals and low priority signals wherein only high priority signal data is used for reconstruction of a frame.

19. The method of claim 14 further comprising the step of packetizing each frame into high priority signals and low priority signals wherein only high priority signal data is used for reconstruction of a frame.

20. A method of displaying an incoming stream of video images comprising the steps of:

(a) receiving said stream of video images in the form of frames comprised of packets, each frame based on a reference frame, and each frame having a predesignated extendable playout time wherein every i*th* frame has a variable extended temporal dependency distance that can be set to any number of frames while all other frames have a temporal dependency distance of one frame;

(b) determining whether any frame packets were lost during transmission;

(c) requesting that any lost frame packets be retransmitted;

(d) determining whether retransmitted lost frame packets have arrived prior to the frame's playout time;

(e) reconstructing said frame using the originally transmitted frame packets and, if necessary, said retransmitted lost frame packets, provided said retransmitted lost frame packets arrived before the expiration of the frame's playout time;

(f) displaying the reconstructed frame;

(g) storing the just displayed reconstructed frame as said reference frame; and (h) reconstructing said reference frame using the just displayed reconstructed frame and said retransmitted lost frame packets that did not arrive before the expiration of the frame's playout time.

21. A method of displaying an incoming stream of video images comprising the steps of:

(a) receiving said stream of video images in the form of frames comprised of packets, each frame based on a reference frame, and each frame having a predesignated playout time;

(b) packetizing each frame into high priority signals and low priority signals wherein only high priority signal data is used for reconstruction of a frame;

(c) determining whether any frame packets were lost during transmission;

(d) requesting that any lost frame packets be retransmitted;

(e) determining whether retransmitted lost frame packets have arrived prior to the frame's playout time;

(f) reconstructing said frame using the originally transmitted frame packets and, if necessary, said retransmitted lost frame packets, provided said retransmitted lost frame packets arrived before the expiration of the frame's playout time;

(g) displaying the reconstructed frame;

(h) storing the just displayed reconstructed frame as said reference frame; and (i) reconstructing said reference frame using the just displayed reconstructed frame and said retransmitted lost frame packets that did not arrive before the expiration of the frame's playout time.

22. A method of displaying an incoming stream of video images comprising the steps of:

(a) receiving said stream of video images in the form of frames comprised of packets, each frame based on a reference frame, and each frame having a predesignated extendable playout time wherein every $i^{th}$ frame has a variable extended temporal dependency distance that can be set to any number of frames while all other frames have a temporal dependency distance of one frame;

(b) packetizing each frame into high priority signals and low priority signals wherein only high priority signal data is used for reconstruction of a frame;

(c) determining whether any frame packets were lost during transmission;

(d) requesting that any lost frame packets be retransmitted;

(e) determining whether retransmitted lost frame packets have arrived prior to the frame's playout time;

(f) reconstructing said frame using the originally transmitted frame packets and, if necessary, said retransmitted lost frame packets, provided said retransmitted lost frame packets arrived before the expiration of the frame's playout time;

(g) displaying the reconstructed frame;

(h) storing the just displayed reconstructed frame as said reference frame; and (i) reconstructing said reference frame using the just displayed reconstructed frame and said retransmitted lost frame packets that did not arrive before the expiration of the frame's playout time.

* * * * *